United States Patent
Matsue et al.

(10) Patent No.: US 8,986,161 B2
(45) Date of Patent: Mar. 24, 2015

(54) POWER TRANSMISSION UNIT

(75) Inventors: Takenori Matsue, Anjo (JP); Koji Kawasaki, Anjo (JP); Masanori Sugiura, Chiryu (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 328 days.

(21) Appl. No.: 13/473,875

(22) Filed: May 17, 2012

(65) Prior Publication Data

US 2012/0309584 A1 Dec. 6, 2012

(30) Foreign Application Priority Data

May 30, 2011 (JP) ................................ 2011-120408

(51) Int. Cl.
| | | |
|---|---|---|
| *B60W 10/101* | (2012.01) | |
| *B60K 6/48* | (2007.10) | |
| *B60W 10/02* | (2006.01) | |
| *B60W 10/06* | (2006.01) | |
| *B60W 10/08* | (2006.01) | |
| *B60W 20/00* | (2006.01) | |

(52) U.S. Cl.
CPC ................. *B60K 6/48* (2013.01); *B60W 10/02* (2013.01); *B60W 10/06* (2013.01); *B60W 10/08* (2013.01); *B60W 10/101* (2013.01); *B60W 20/00* (2013.01); *Y02T 10/6286* (2013.01); *B60W 2510/0638* (2013.01); *B60W 2710/0644* (2013.01); *B60W 2710/1005* (2013.01); *B60W 20/40* (2013.01); *Y02T 10/6221* (2013.01)
USPC ........................................ 477/5; 475/5; 475/8

(58) Field of Classification Search
USPC ........................................ 477/3, 4, 5; 475/5, 8
See application file for complete search history.

(56) References Cited

U.S. PATENT DOCUMENTS

| | | | |
|---|---|---|---|
| 8,622,870 B2 * | 1/2014 | Kawasaki | ........................ 477/3 |
| 2010/0120579 A1 | 5/2010 | Kawasaki | |

FOREIGN PATENT DOCUMENTS

| | | |
|---|---|---|
| JP | 3-852345 | 11/2006 |
| JP | 4-433536 | 3/2010 |
| JP | 2010-143308 | 7/2010 |

OTHER PUBLICATIONS

Office Action (2 pages) dated Jan. 29, 2013 issued in corresponding Japanese Application No. 2011-120408 and English translation (2 pages).

* cited by examiner

*Primary Examiner* — Jacob S Scott
(74) *Attorney, Agent, or Firm* — Nixon & Vanderhye P.C.

(57) ABSTRACT

After an engine starts, a rotation speed of the engine is fed back to a target rotation speed that is defined in response to requested power for the engine. In addition, by operating a gear ratio of a CVT, a rotation speed of an output side of a one-way bearing is fed back to the target rotation speed.

15 Claims, 18 Drawing Sheets

FIG. 2A  <MODE 1: START BY MOTOR GENERATOR>
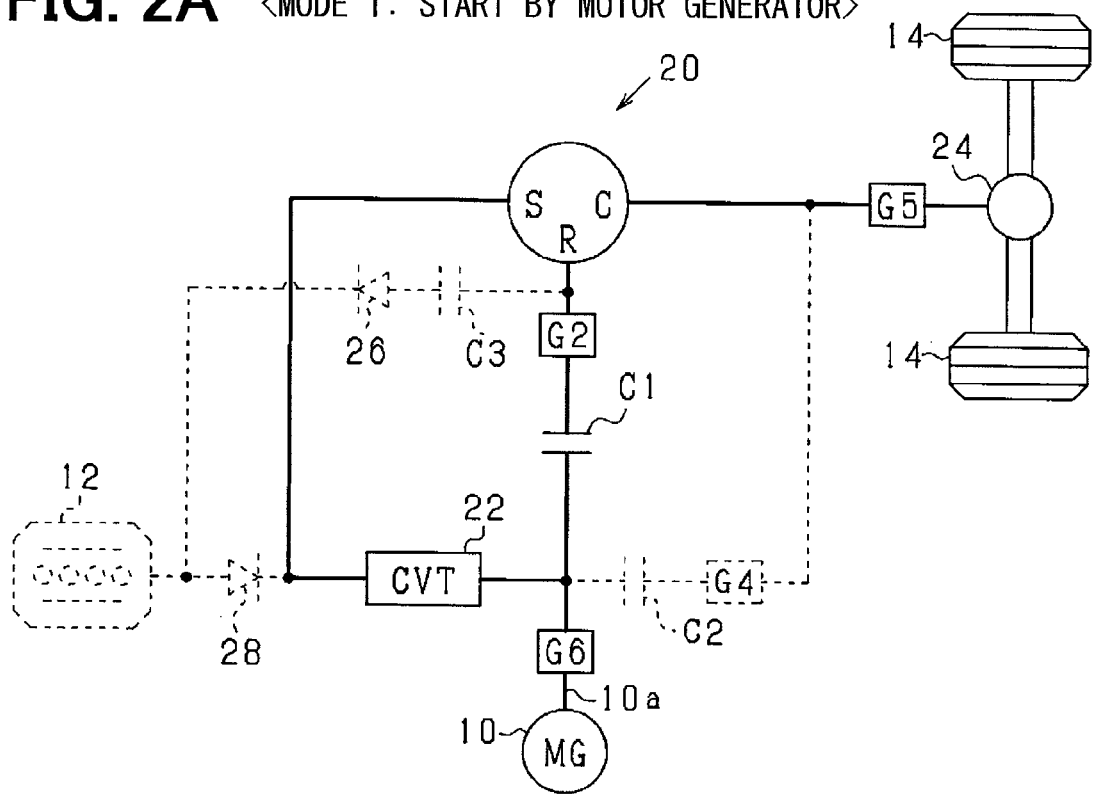
FIG. 2B  <MODE 1: START BY MOTOR GENERATOR>
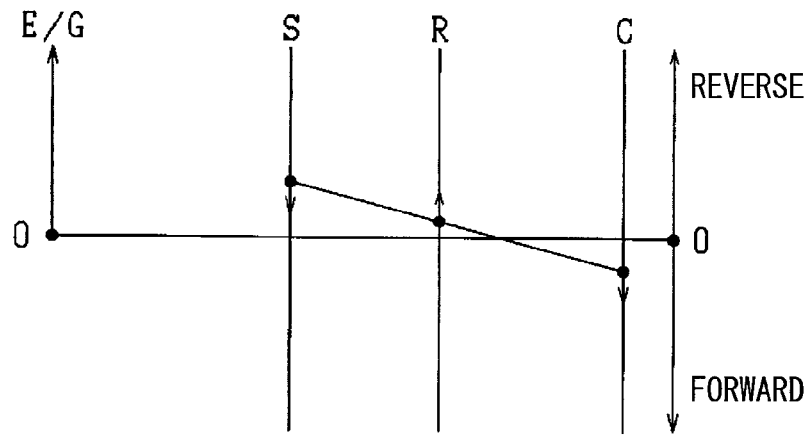
FIG. 2C  <MODE 1: START BY MOTOR GENERATOR>
| ROTATION SPEED | | | TORQUE | | | POWER | | |
|---|---|---|---|---|---|---|---|---|
| S | R | C | S | R | C | S | R | C |
| + | + | − | − | + | − | − | + | + |

<MODE 2: EV TRAVEL (DIRECT COUPLING TO MOTOR GENERATOR)>

FIG. 4A  <MODE 2: ENGINE START>
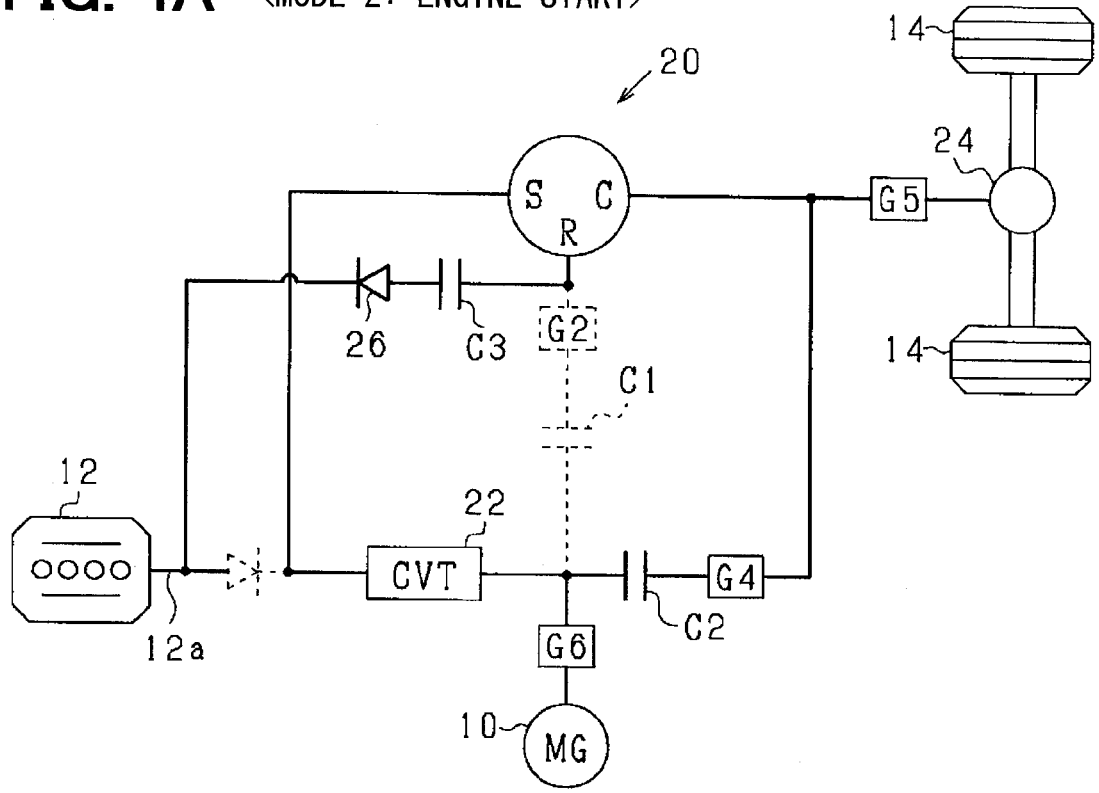
FIG. 4B  <MODE 2: ENGINE START>
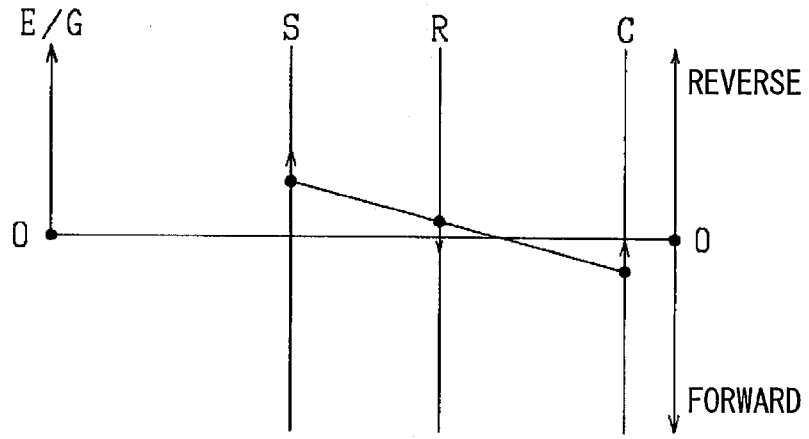
FIG. 4C  <MODE 2: ENGINE START>
| ROTATION SPEED | | | TORQUE | | | POWER | | |
|---|---|---|---|---|---|---|---|---|
| S | R | C | S | R | C | S | R | C |
| + | + | − | + | − | + | + | + | − |

<MODE 2: TRAVEL BY ENGINE>

POWER TRANSMISSION UNIT

CROSS REFERENCE TO RELATED APPLICATION

This application is based on Japanese Patent Application No. 2011-120408 filed on May 30, 2011, the disclosure of which is incorporated herein by reference.

TECHNICAL FIELD

The present disclosure relates to a power transmission unit having multiple power split rotors which rotate in conjunction with each other to split power among a rotary electric apparatus, an internal combustion engine, and drive wheels.

BACKGROUND

[Patent document 1] JP 2010-285140 A (US 2010/0120579 A1)

For instance, Patent document 1 proposes such a power transmission unit which uses one of rotors forming a planetary gear mechanism as a start rotor to apply a start rotational force to an internal combustion engine, and further uses another of the rotors as a transmission rotor which is supplied with power of the internal combustion engine. In detail, a one-way bearing is provided between the internal combustion engine and the transmission rotor. Thereby, after start of the internal combustion engine, a rotation speed of the internal combustion engine increases, thereby transmitting power to the transmission rotor via the one-way bearing. As a result, the start of power supply by the internal combustion engine may be controlled simply.

By the way, the inventors have found that in cases where (i) an internal combustion engine is started, (ii) a rotation speed of an internal combustion engine is being controlled so as to follow a rotation speed of a transmission rotor, and (iii) the rotation speed of the transmission rotor changes, a one-way bearing may be engaged suddenly to thereby cause a shock in a power transmission unit. Further, the inventors have found that, in cases where (i) a rotational force of a start rotor is applied to an internal combustion engine, and then (ii) combustion control of the internal combustion engine is started, a rotation speed of the internal combustion engine increases suddenly and a one-way bearing is engaged suddenly, which may cause a shock in a power transmission unit. Yet further, the inventors have found that after the start of the internal combustion engine, a time taken by engagement of the one-way bearing becomes long depending on a drive condition, thus possibly degrading acceleration.

SUMMARY

It is an object of the present disclosure to provide a new power transmission unit having multiple power split rotors that rotate in conjunction with each other so as to split power among a rotary electric apparatus, an internal combustion engine, and drive wheels.

To achieve the above object, according to a first example of the present disclosure, a power transmission unit is provided as follows. The power transmission unit has a plurality of power split rotors that rotate in conjunction with each other to split power among a rotary electric apparatus, an internal combustion engine, and drive wheels. The power split rotors include a start rotor that supplies a start rotational force to the internal combustion engine, and a transmission rotor that is separate from the start rotor and mechanically coupled to the internal combustion engine. The power transmission unit includes: a speed ratio varying section that makes variable a speed ratio, which is a ratio of a rotation speed of the drive wheels relative to a rotation speed of the transmission rotor; a start power transmission regulating section that switches transmission and interruption of power from the start rotor to the internal combustion engine; a transmission power transmission regulating section that switches transmission and interruption of power from the internal combustion engine to the transmission rotor; a target speed setting section that sets a target rotation speed of the internal combustion engine on a basis of requested power for the internal combustion engine when a start request of the internal combustion engine arises; and a transmission start control section. The transmission start control section controls a rotation speed of the internal combustion engine to the target rotation speed so as to output power of the internal combustion engine to the transmission power transmission regulating section after start of combustion control of the internal combustion engine, and controls, by operating the speed ratio varying section, an output side of the transmission power transmission regulating section to a rotation speed of an input side of the transmission power transmission regulating section at a time when the rotation speed of the internal combustion engine becomes the target rotation speed, the output side of the transmission power transmission regulating section being coupled with the transmission rotor.

In the above first example, to output power of an internal combustion engine via a transmission power transmission regulating section, rotation speeds of an input side and output side of the transmission power transmission regulating section may be required to match. In case of no power transmission by the transmission power transmission regulating section, a rotation speed of the internal combustion engine may be increased easily. Therefore, to start transmission of power of the internal combustion engine rapidly, a rotation speed of the internal combustion engine is effectively increased to control a rotation speed of the input side of the transmission power transmission regulating section to that of its output side. However, in this case, the inventors have found that vibration is apt to be caused as power transmission by the transmission power transmission regulating section starts. In the above configuration, in view of this disadvantage, a rotation speed of an internal combustion engine is controlled to a target rotation speed defined in response to requested power of the internal combustion engine and a rotation speed of the output side of a transmission power transmission regulating section is controlled on the basis of the above target rotational speed. As a result, the vibration may be preferably avoided.

According to a second example of the present disclosure, a power transmission unit is provided as follows. The power transmission unit has a plurality of power split rotors that rotate in conjunction with each other to split power among a rotary electric apparatus, an internal combustion engine, and drive wheels. The power split rotors include a start rotor that supplies a start rotational force to the internal combustion engine, and a transmission rotor separate from the start rotor and mechanically coupled to the internal combustion engine. The power transmission unit includes: a speed ratio varying section that varies a speed ratio, which is a ratio of a rotation speed of the drive wheel relative to s a rotation speed of the transmission rotor; a start power transmission regulating section that switches transmission and interception of power from the start rotor to the internal combustion engine; and a transmission power transmission regulating section that switches transmission and interception of power from the internal combustion engine to the transmission rotor. Herein, a low start set is provided such that when a ratio of a rotation speed of the drive wheels relative to a rotation speed of the transmission rotor is lowered by increasing the rotation speed of the transmission rotor using the speed ratio varying section, a rotation speed of the start rotor increases.

In cases where with a start of the combustion control for the internal combustion engine, the rotation speed of the output shaft rapidly increases, the rotation speed of the input side of the transmission power transmission regulating section may become equal to or greater than the rotation speed of the output side. In response thereto, in the above configuration, in a process where the rotation speed of the start rotor is increased, the rotation speed of the transmission rotor is desirably increased.

According to a third example of the present disclosure, a power transmission unit is provided as follows. The power transmission unit has a plurality of power split rotors that rotate in conjunction with each other to split power among a rotary electric apparatus, an internal combustion engine, and drive wheels. The power split rotors include a start rotor that supplies a start rotational force to the internal combustion engine, and a transmission rotor separate from the start rotor and mechanically coupled to the internal combustion engine. The power transmission unit includes: a speed ratio varying section that makes variable a speed ratio, which is a ratio of a rotation speed of the drive wheels relative to a rotation speed of the transmission rotor; a start power transmission regulating section that switches transmission and interruption of power from the start rotor to the internal combustion engine; and a transmission power transmission regulating section that switches transmission and interruption of power from the internal combustion engine to the transmission rotor. Herein, a high start set is provided such that when a ratio of a rotation speed of the drive wheels relative to a rotation speed of the transmission rotor is heightened by decreasing the rotation speed of the transmission rotor using the speed ratio varying section, a rotation speed of the start rotor increase.

When power of the internal combustion engine is outputted to a transmission rotor, a target rotation speed of the output side is defined in response to requested power of the internal combustion engine. Accordingly, when a rotation speed of the output is higher than the target rotation speed before the start of the internal combustion engine, the rotation speed of the output side may be required to be decreased. Suppose a case where a rotation speed of the transmission rotor is higher than a rotation speed requested in power transmission of the internal combustion engine before a rotation speed of a start rotor is increased to start the internal combustion engine. In such a case, in the above configuration, a rotation speed of the transmission rotor decreases by a process to increase a rotation speed of the start rotor. As a result, the rotation speed of the transmission rotor may be controlled to a requested rotation speed.

BRIEF DESCRIPTION OF THE DRAWINGS

The above and other objects, features, and advantages of the present disclosure will become more apparent from the following detailed description made with reference to the accompanying drawings. In the drawings:

FIGS. 2A, 2B, and 2C show power transmission when a vehicle starts in the first embodiment;
FIGS. 4A, 4B, and 4C show power transmission at engine start of the first embodiment;

DETAILED DESCRIPTION

[First Embodiment]

Hereafter, a first embodiment of a power transmission unit of the present disclosure is described in reference to the appended drawings.

Figure 1:
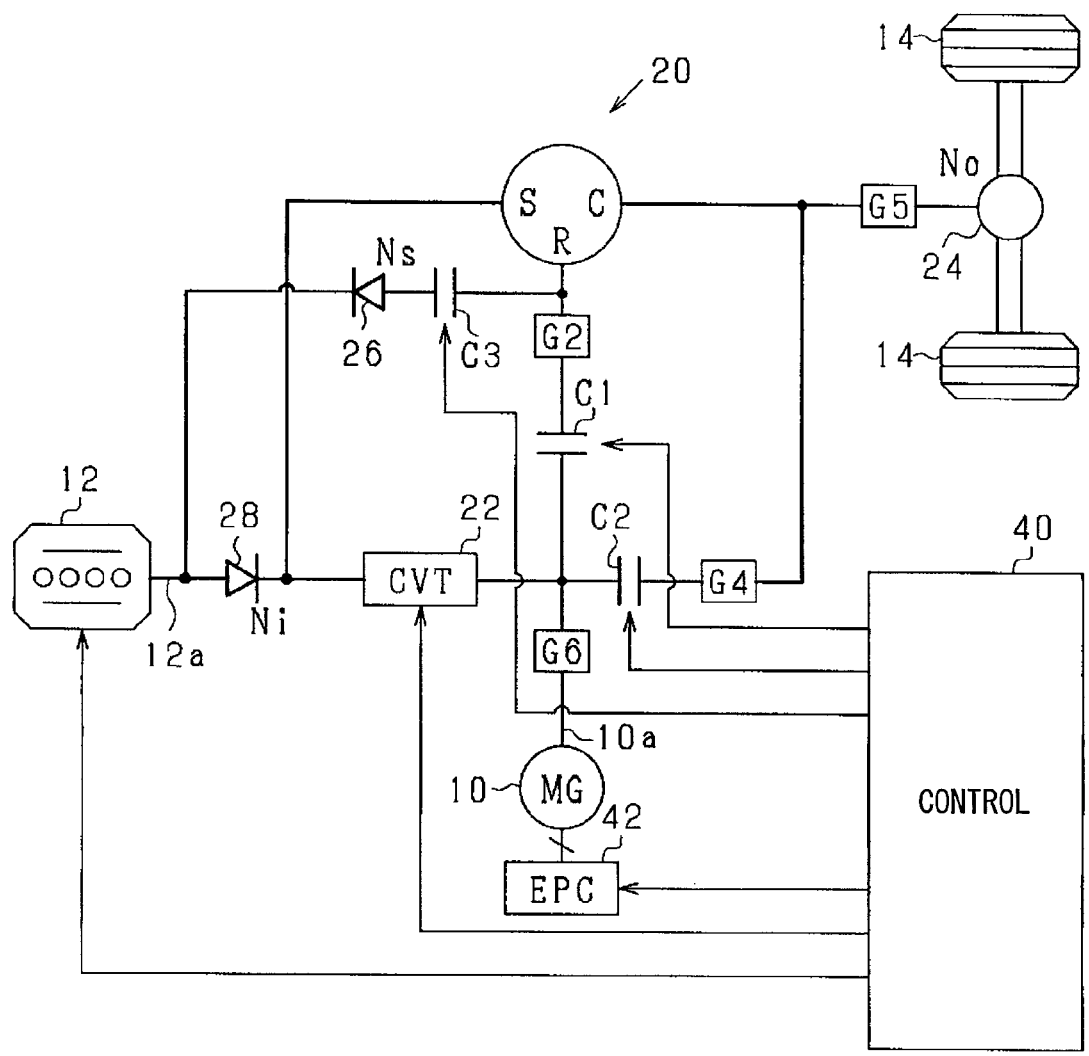
FIG. 1 shows a system structure of a first embodiment.

FIG. 1 shows a system structure of this embodiment.

A motor generator 10 shown is a three-phase alternating current motor and generator. As well as an internal combustion engine (engine 12), the motor generator 10 functions as a power generator to drive a vehicle. On the other hand, a power split mechanism 20 splits power among the motor generator 10, the engine 12, and drive wheels 14.

The power split mechanism 20 is formed of one planetary gear mechanism, and includes a sun gear S, a carrier C, and a ring gear R as power split rotors. The planetary gear mechanism of this embodiment has a so-called double pinion in which a rotation speed of the carrier C may be zero when signs of rotation speeds of the sun gear S and ring gear R are the same.

A rotation shaft 10a of the motor generator 10 is mechanically coupled to the ring gear R of the power split mechanism 20 via a gear G2, a clutch C1, and a gear G6. The ring gear R is mechanically coupled to the sun gear S via a continuously variable transmission (CVT 22), the clutch C1, and the gear G2. Accordingly, the motor generator 10 also is mechanically coupled to the sun gear S via the gear G6 and the CVT 22. That is, the motor generator 10 and the sun gear S have a path not having any other power split rotors forming the power split mechanism 20 as a mechanical coupling path for rotation in conjunction with one another. The CVT 22 in this embodiment is assumed to be a mechanical one. In detail, the CVT 22 is assumed to be a belt type one using a metal belt or a rubber belt. The gears G2 and G6 are each a device or means to change a ratio between rotation speeds of the input side and output side by a fixed ratio, and are a device or means (forward gear) not to reverse signs of rotation speeds of the input side and output side. Further, the clutch C1 is an electronically-controlled engagement device or means that is hydraulically driven to switch an engaged state and disengaged state between the input side and output side. The input side and output side signify an input side of energy and an output side of energy, respectively. This relationship is changeable.

The drive wheels 14 are mechanically coupled to the carrier C of the power split mechanism 20. In detail, the drive wheels 14 are mechanically coupled to the carrier C via a gear G5 and a differential gear 24. Here, the gear G5 is a device or means (counter gear) to change a ratio between rotation speeds of the input side and output side by a fixed ratio and to reverse a sign of the rotation speed of the input side.

The carrier C is mechanically coupled to the ring gear R of the power split mechanism 20 via the gear G2, the clutch C1, a clutch C2, and a gear G4. Here, the gear G4 is a device or means (counter gear) to change a ratio between rotation speeds of the input side and output side by a fixed ratio and to reverse a sign of the rotation speed of the input side. The clutch C2 is an electronically-controlled engagement device or means which is hydraulically controlled to switch an engaged state and disengaged state between the input side and output side. Any one of the input side and output side of the clutch C1 and any one of the input side and output side of the clutch C2 are directly coupled to the same one rotation shaft.

Further, a crankshaft (output shaft 12*a*) of the engine 12 is mechanically coupled to the ring gear R via the clutch C3 and the one-way bearing 26. The one-way bearing 26 is a one-way transmission mechanism to transmit power when a relative rotation speed of the input side (the side coupled with the ring gear R, or the ring gear side) to the output side (the side coupled with the output shaft 12*a*, or the output shaft side) is not negative. In other words, unless the rotation speed of the output side is greater than that of the input side, the output side follows the input side. On the other hand, the clutch C3 is an electronically-controlled engagement device or means which is hydraulically driven to switch the engaged state and disengaged state between the input side and output side. In detail, the clutch C3 uses a normally open type in this embodiment.

The sun gear S is connectable to the output shaft 12*a* of the engine 12 via a one-way bearing 28. Here, the one-way bearing 28 is a one-way transmission mechanism to transmit power when a relative rotation speed of its input side (side coupled with the output shaft 12*a*, or output shaft side) to output side (side coupled with the sun gear S, or sun gear side) is not negative. In other words, unless a rotation speed of the output side is greater than that of the input side, the output side follows the input side.

The gears G2, G4, G5, and G6 each may be a device or means that have multiple gears to change a ratio between rotation speeds of the input side and output side by a fixed ratio.

A control apparatus 40 controls the above power transmission unit. In detail, the control apparatus 40 controls power transmission by operating the clutches C1, C2, and C3 and the CVT 22, a control amount of the engine 12, and a control amount of the motor generator 10 by operating a power conversion circuit 42.

Especially, the control apparatus 40 achieves any one of Mode 1 in which the clutch C1 is in the engaged state and the clutch C2 is in the disengaged state and Mode 2 in which the clutch C1 is in the disengaged state and the clutch C2 is in the engaged state. Hereinafter, after the explanation of the processing specific to the "Mode 1," the processing specific to "Mode 2 " is explained. Next, the "switch from the Mode 1 to Mode 2 " is explained. Finally, the "detail of start of the engine 12" is explained.

<Mode 1>

The start of a vehicle by the motor generator 10 of this embodiment is explained in FIGS. 2A, 2B, and 2C. Here, FIG. 2A shows a power transmission path at the start, and FIG. 2B shows a collinear diagram of the power split mechanism 20 at the start together with a rotation speed of the engine 12. In FIG. 2B, a negative direction of a rotation speed of the carrier C is defined as forward because the gear G5 is a counter gear. In the collinear diagram, the arrows show directions of torque.

In this case as shown, the clutch C2 is in the disengaged state to make the engine 12 idle. In this case, a rotation speed of the power split rotor of the power split mechanism 20 is controlled by a rotation speed of the motor generator 10 and a gear ratio of the CVT 22. That is, in the collinear diagram, a rotation speed of the sun gear S, a rotation speed of the ring gear R, and a rotation speed of the carrier C are aligned. Therefore, a rotation speed of the sun gear S and a rotation speed of the ring gear R are defined to uniquely define a rotation speed of the carrier C, which is the remaining rotor.

Here, in this embodiment, in Mode 1, as shown in FIG. 2C, signs of power of the sun gear S and ring gear R, which form the power split mechanism 20 and are rotors other than the carrier C, are different from one another to generate power circulation between the sun gear S and ring gear R. That is, the power outputted from the ring gear R flows into the sun gear S via a path including the gear G2, clutch C1, and CVT 22. When the power circulation generates, a geared neutral state in which a rotation speed of the drive wheels 14 is zero may be realized while the motor generator 10 is operating, and a sign of the rotation speed may be reversed. Especially when a rotation speed of the drive wheels 14 is made very low, the torque supplied to the drive wheels 14 can be made high. As a result, high torque may be generated at the start by the motor generator 10 without enlargement of the motor generator 10. A sign of power of each power split rotor is defined as positive when the power split rotor works toward the outside of the power split mechanism 20.

<Mode 2>

Figure 3:
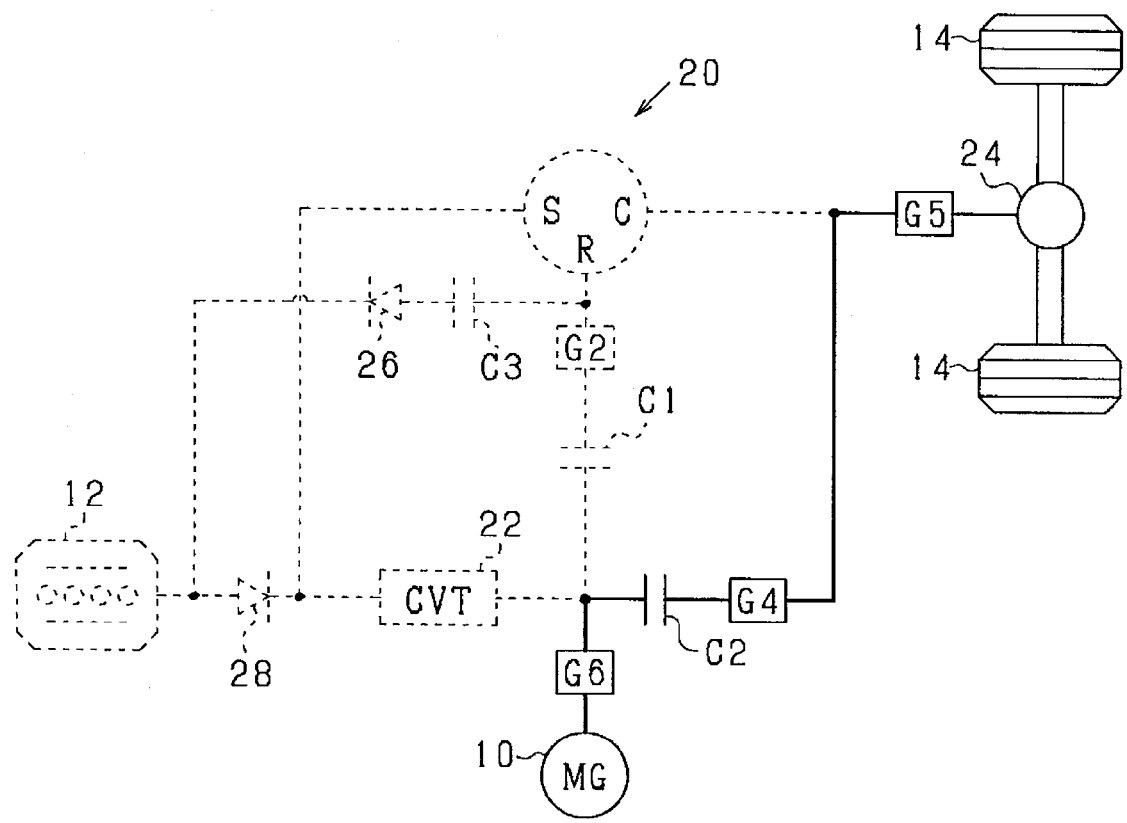
FIG. 3 shows power transmission in an EV travel of the first embodiment.

FIG. 3 shows a power transmission path in case of the so-called EV travel to drive a vehicle only by the motor generator 10 in Mode 2.

As shown in this case, power is transmitted between the motor generator 10 and drive wheels 14 via the gear G6, clutch C2, gear G4, and gear G5 without being transmitted via the power split mechanism 20. Since the torque of the carrier C, sun gear S, and ring gear R is in a proportional relationship, no torque is applied to the sun gear S and carrier C when no toque is applied to the ring gear R.

In this case, since the power of the motor generator 10 is transmitted directly to the drive wheels 14 without being transmitted via the CVT 22, power losses may be reduced.

FIG. 4A shows a transmission power path at start of the engine 12 in Mode 2, and FIG. 4B shows a collinear diagram in that case.

As shown, the clutch C3 is engaged to enable torque transmission via the power split mechanism 20. That is, the power of the start rotor (ring gear R) for starting the engine 12 is transmitted to the output shaft 12*a* of the engine 12 by the one-way bearing 26. FIG. 4C shows a sign of each rotor of the power split mechanism 20. As shown, in this case, signs of power of the sun gear S and carrier C are different from one another to generate power circulation between the sun gear S and carrier C. That is, the power outputted from the sun gear S flows into the carrier C. As a result, even when an absolute value of the output side of the motor generator 10 or drive wheels 14 is not zero, the power of the ring gear R may be zero or very low, and an absolute value of the power of the ring gear R may be small. As a result, even when the clutch C3 is engaged in a state in which the output shaft 12a of the engine 12 is stopped, a rotational speed difference of the input side to output side of the one-way bearing 26 may be made very small. As a result, vibration of the power split mechanism 20 due to a switch of the clutch C3 to the engaged state may be preferably reduced.

It is preferable that the clutch C3 is engaged when a rotation speed of the engine 12 is equal to or below the minimum rotation speed for stably operating the engine 12. In other cases, combustion control may be started in the engine 12 during rotation.

Figure 5:
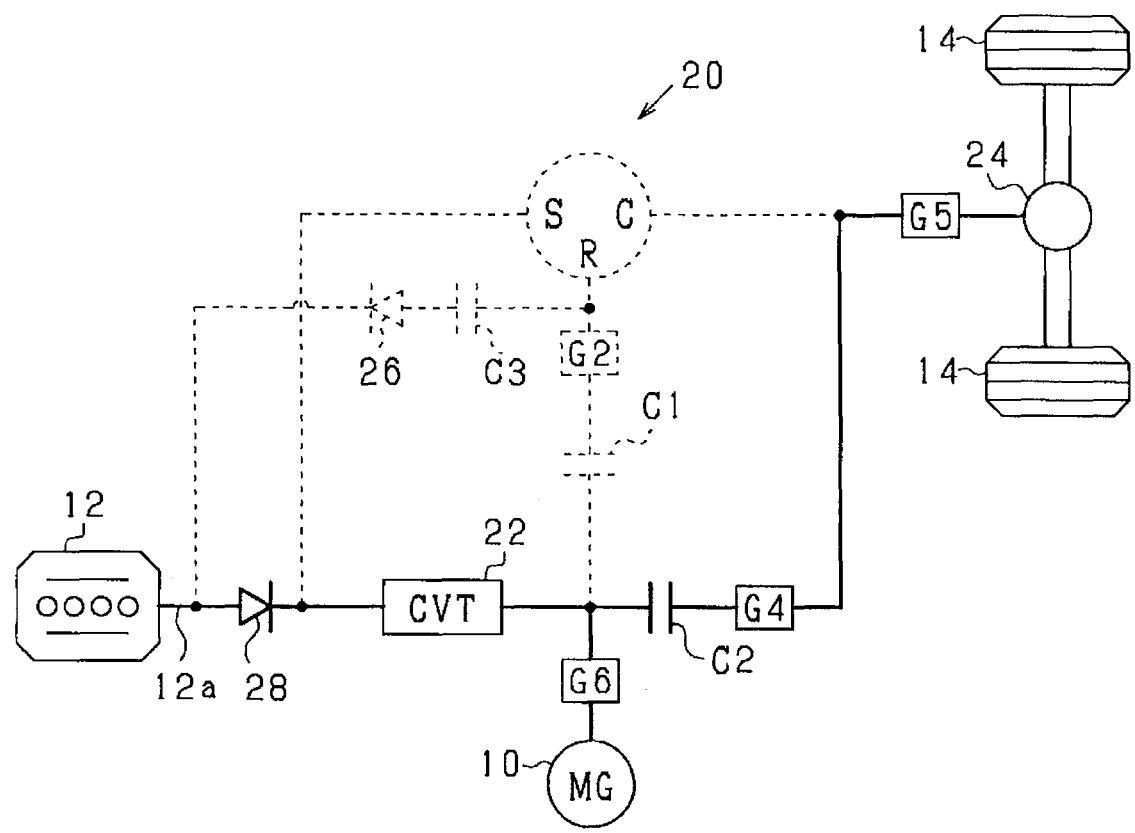
FIG. 5 shows power transmission at travel by an engine of the first embodiment.

FIG. 5 shows a transmission power path at the time of vehicle travel by the engine 12 in Mode 2.

As shown, a rotation speed of the engine 12 increases and a rotation speed of the input side of the one-way bearing 28 becomes a rotation speed of its output side to output the driving force of the engine 12 to the output side of the one-way bearing 28 via the one-way bearing 28. However, the clutch C3 is disengaged to transmit power between the motor generator 10 and engine 12 and the drive wheels 14 without the power split mechanism 20. Here, the output of the engine 12 is transmitted to the drive wheels 14 after a rotation speed of the engine 12 is changed by the CVT 22.

The motor generator 10 may not be necessarily operated as an electric motor during travel by the engine 12, but may be operated, for example, as a generator. Instead, the motor generator 10 may be stopped and thus unloaded.

<Switch from Mode 1 to Mode 2>

Figure 6A:
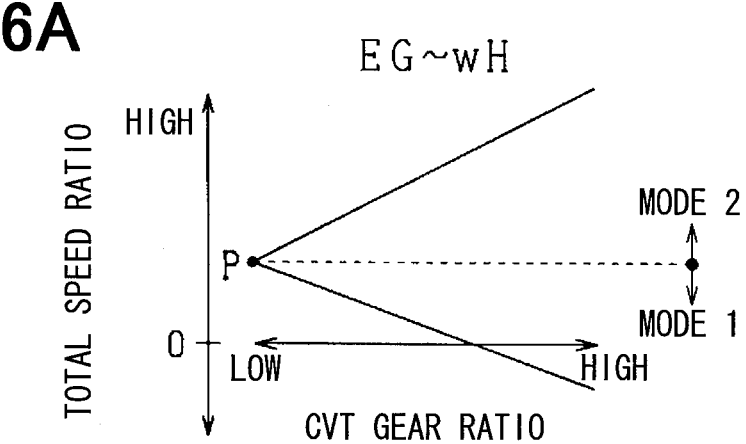
FIGS. 6A, 6B, and 6C show a speed ratio and transmission efficiency of a power transmission unit of the first embodiment.
Figure 6B:
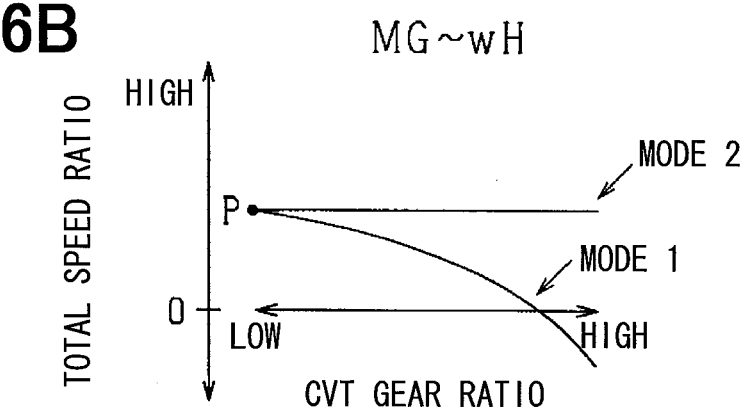

FIG. 6A shows a relationship between a total speed ratio (i.e., a total rotation speed varying ratio) from the engine 12 to drive wheels 14 and a gear ratio of the CVT 22. FIG. 6B a relationship between a total speed ratio from the motor generator 10 to drive wheels 14 and a gear ratio of the CVT 22. Here, a total speed ratio from a (input side or upstream side) to b (output side or downstream side) is "(rotation speed of b)/(rotation speed of a)," and is an inverse of the gear ratio. In other words, the total speed ratio is a ratio of the rotation speed of b relative to the rotation speed of a.

As shown, in Mode 1, a gear ratio of the CVT 22 may be continuously varied to change the drive wheels 14 from reverse drive (back) to high speed drive via zero speed. Then, at a predetermined gear ratio, Mode 1 is switched to Mode 2. As a result, a variable range of the total speed ratio for the engine 12 is expandable.

That is, as shown in FIG. 6A, the total speed ratio from the engine 12 to the drive wheels 14 may be increased by changing the gear ratio of the CVT 22 in Mode 1. Then, the total speed ratio can be further increased by switching Mode 1 to Mode 2 at a mode switch point P and switching (turnover) a direction of change of the gear ratio of the CVT 22 oppositely.

This setting is realized by a setting in which a sign of a direction of a change of the total speed ratio relative to a change of the gear ratio of the CVT 22 is reversed between Mode 1 and Mode 2. The condition for the setting is that a sign of a derivative value by the gear ratio of the CVT 22 in a function in which the gear ratio of the CVT 22 is an independent variable and the total speed ratio is a dependent variable is reversed between Mode 1 and Mode 2. The device or means to realize this condition is the gear G2, G4, and G5. In detail, in accordance with a sign of a product of their ratios, it is determined whether the turnover is possible. As shown in FIG. 6B, the total speed ratio from the motor generator 10 to the drive wheels 14 does not change in Mode 2. This is because the drive wheels 14 and the motor generator 10 are directly coupled in Mode 2.

Figure 6C:
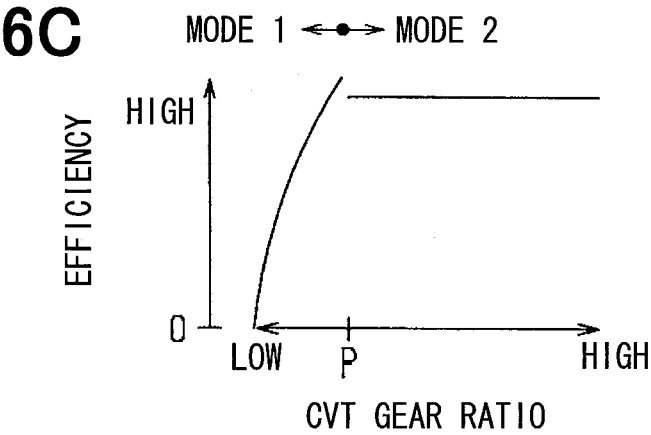

As mentioned above, in this embodiment, since the variable range of the total speed ratio is expandable by switching Mode 1 and Mode 2, the CVT 22 may be made compact. Further, in Mode 2, since power circulation does not arise fundamentally, a power transmission efficiency, which is a ratio between input energy and output energy, may be higher than that in the case where only Mode 1 is executed. FIG. 6C shows a relationship between the total speed ratio and transmission efficiency for the engine 12. As shown, a range where the transmission efficiency is very low is present in Mode 1, but the transmission efficiency is high in Mode 2. In FIG. 6C, the transmission efficiency in Mode 1 just before switch to Mode 2 is higher than the transmission efficiency in Mode 2. This does not signify that the transmission efficiency in the case where only Mode 1 is executed may be higher than that in the case where Mode 1 is switched to Mode 2.

Thus, in this embodiment, in Mode 1, since the torque applied to the drive wheels 14 may be great while the transmission efficiency is low, the motor generator 10 may be made compact. Then, advantageously, Mode 1 may be switched to Mode 2 in the range where a rotation speed of the drive wheels 14 is a predetermined value or over to increase the transmission efficiency and to expand the variable range of the total speed ratio. In Mode 2, the power split mechanism 20 is unnecessary for the power transmission to the drive wheels 14. By use of the ring gear R, which has been out of use, initial rotation may be applied to the engine 12. As a result, a device or means to start the engine 12 may be structured by appropriating the component out of use in Mode 2.

<Detail of Engine Start>

Figure 7:
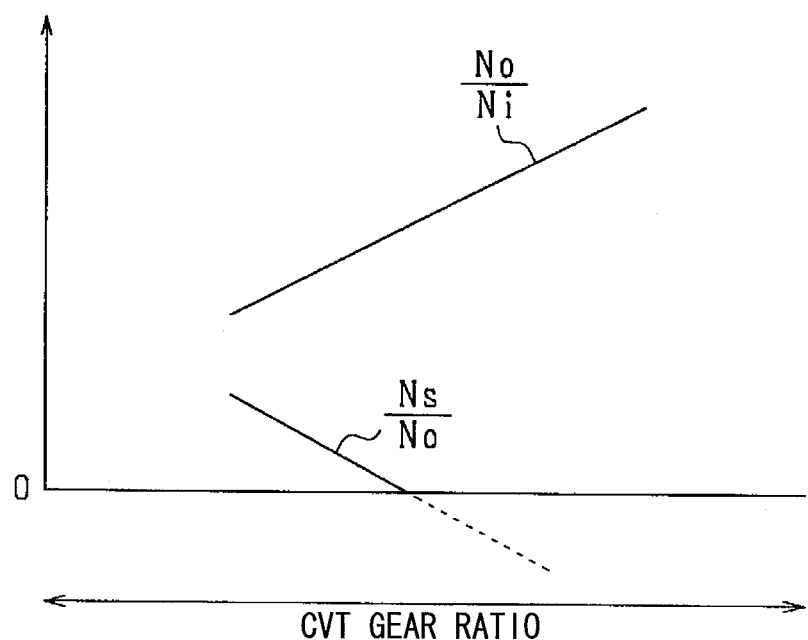
FIG. 7 shows a setting of engine start in Mode 2 of the first embodiment.

As mentioned above, to start the engine 12 in Mode 2, the clutch C3 is engaged while the rotation speed of the ring gear R, which is the start rotor, is very low or zero, and then the rotation speed of the ring gear R is increased to increase the rotation speed of the output shaft 12a of the engine 12. When a rotation speed of the engine 12 increases suddenly at the start of combustion of the engine 12, the one-way bearing 28 is engaged suddenly. This may cause vibration on a vehicle. In this embodiment, as shown in FIG. 7, a rotation speed of the output side of the one-way bearing 28 is set to be increased by increasing a rotation speed of the ring gear R, which is the start rotor. In FIG. 7, as shown in FIG. 1, a rotation speed (start rotation speed Ns) of the input side of the one-way bearing 26, a rotation speed (transmission side rotation speed Ni) of the output side of the one-way bearing 28, and a rotation speed (output side rotation speed No) of the output side of the gear G5 are used.

When a gear ratio of the CVT 22 is controlled to lower a ratio (No/Ni) of the output side rotation speed No relative to the transmission side rotation speed Ni by increasing the transmission side rotation speed Ni relative to the output side rotation speed No, the start rotation speed Ns increases. Accordingly, after the clutch C3 is engaged, the total speed ratio (No/Ni), which is a ratio of the output side rotation speed No relative to the transmission side rotation speed Ni, is lowered, thereby increasing a rotation speed of the engine 12. Therefore, when a rotation speed of the engine 12 is increased, a relative rotation speed of the output side to input side of the one-way bearing 28 is easily equal to or over an increase amount of rotations of the engine 12 at its combustion start. That is, due to restriction by responsiveness of the CVT 22, a time taken to change a gear ratio of the CVT 22 is longer than a time taken to rapidly increase a rotation speed of the engine 12 at combustion start of the engine 12. Therefore, in the setting in which the relative rotation speed of the output side to input side of the one-way bearing 28 is decreased by increasing the rotation speed of the engine 12, a gear ratio of the CVT 22 may be again changed oppositely before the combustion start after a rotation speed of the engine 12 is increased.

Figure 8:
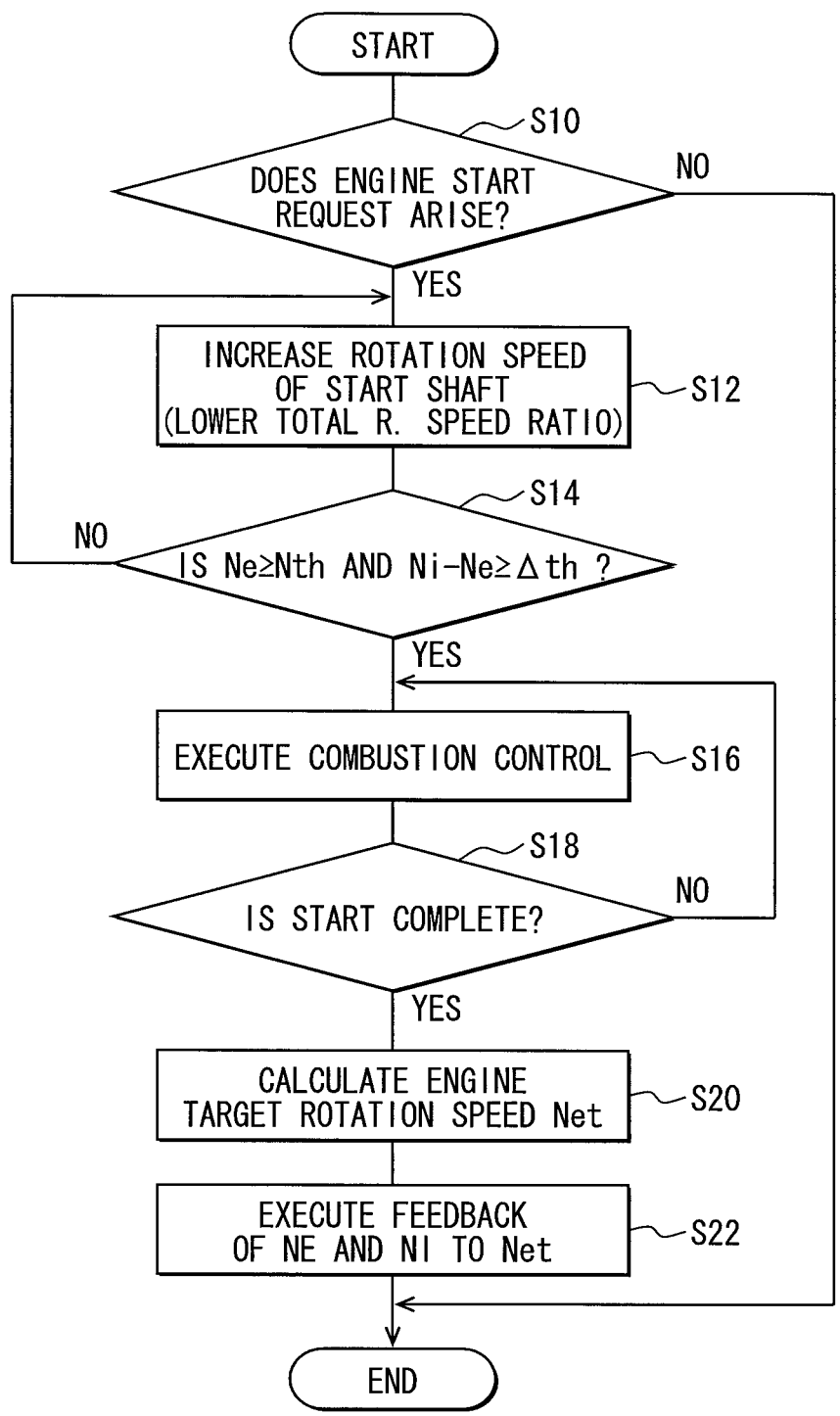
FIG. 8 shows a flowchart showing a procedure of engine start of the first embodiment.

Further in this embodiment, the vibration due to a start of combustion of the engine 12 is avoided certainly by the processing shown in FIG. 8.

FIG. 8 shows a procedure of start of the engine 12 of this embodiment. This processing is repeated, for example, by a predetermined period by the control apparatus 40.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means.

In this processing, first at S10, it is determined whether there is an engine start request. The engine start request arises when a charging rate of a battery (not shown) falls and when requested power for a vehicle calculated in response to acceleration by a user may not be satisfied only by the motor generator 10. When it is determined that the start request arises, the total speed ratio is lowered to increase the start rotation speed Ns at S12.

At S14, it is determined whether an AND of a condition (a) in which an engine rotation speed Ne is a threshold speed Nth or more and a condition (b) in which the transmission side rotation speed Ni is over the engine rotation speed Ne by the threshold $\Delta$th or over is truth. Here, the condition (a) is set to determine whether the engine 12 may transition to a state in which the engine 12 may operate by itself by combustion start of the engine 12. The threshold speed Nth is set to a very low speed equal to or over the lowermost speed at which the transition to the self-sustaining operation is assumed to be possible. On the other hand, the condition (b) is set to determine whether the one-way bearing 28 is engaged due to sudden increase of a rotation speed of the engine 12 caused by its start of combustion. Here, the threshold $\Delta$th is set to a value by which a rotation speed of the input side of the one-way bearing 28 is assumed not to exceed that of its output side even due to sudden increase in the engine rotation speed Ne at start of combustion of the engine 12. When, for example, it is difficult to make the transmission side rotation speed Ni exceed the start rotation speed Ns by the threshold $\Delta$th or over only by decreasing the total speed ratio, the total speed ratio may continue to be further decreased while the clutch C3 is disengaged after the condition (a) is satisfied.

When a positive determination is made at S14, combustion control is started at S16. At S18, it is determined whether the engine 12 has been started. When the engine 12 has been started, the target rotation speed Net of the engine 12 is calculated in response to requested power for the engine 12 at S20. For example, among operating points formed from the torque and rotation speed of the engine 12, a rotation speed corresponding to an operating point at which requested power for the engine 12 is satisfied and fuel consumption is minimum may be selected.

At S22, the engine rotation speed Ne and transmission side rotation speed Ni are each fed back to the target rotational speed Net. Here, the transmission side rotation speed Ni is controlled by operation of a gear ratio of the CVT 22. The gear ratio of the CVT 22 is defined by a ratio of rotation speeds of both sides of the CVT 22, and is fed back in response to a detection value of each rotation speed of both sides of the CVT 22. As a result, in the structure in which no device or means to change the speed ratio is present between the CVT 22 and one-way bearing 28 as in this embodiment, a rotation speed of the output side of the one-way bearing 28 is controllable by a detection value of the rotation speed of the output side of the one-way bearing 28 used to operate the CVT 22 as a direct control amount. As a result, a rotation speed of the input side of the one-way bearing 28 may be controlled to the same rotation speed accurately.

When S22 is completed or when a negative determination is made at S10, this processing is once ended.

Figure 9A:
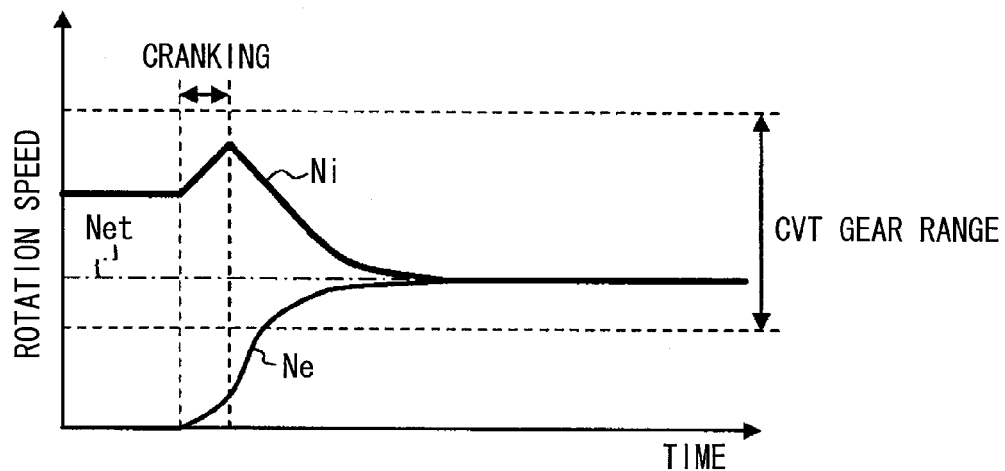
FIGS. 9A, 9B, 9C show time charts showing engine start in Mode 2 of the first embodiment.
Figure 9B:
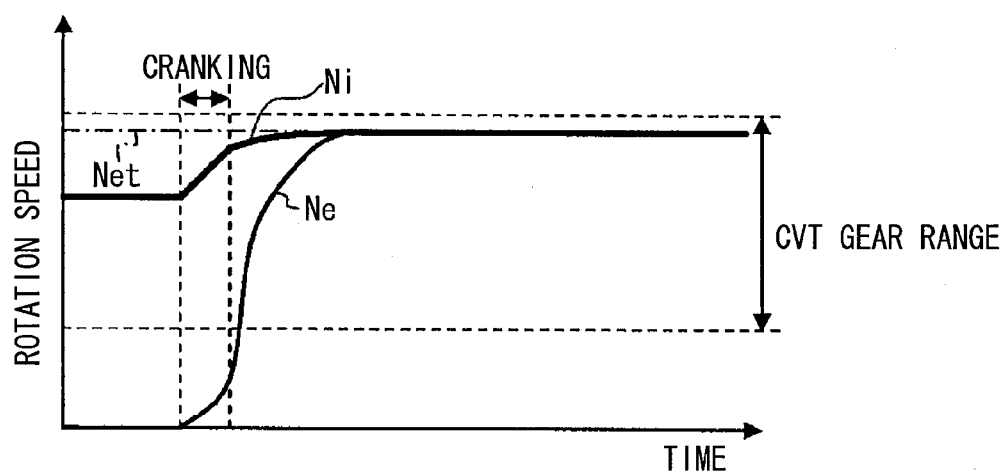

FIG. 9A and FIG. 9B show advantageous effect of this embodiment. FIG. 9A and FIG. 9B do not accurately show the increase of a rotation speed of the output shaft 12a at combustion start of the engine 12. This is to clearly describe a relationship between an increase of a rotation speed of the ring gear R, which is the start rotor, and a rotation speed of the sun gear S, which is the transmission rotor. That increase is achieved by operation of the CVT 22.

Figure 9C:
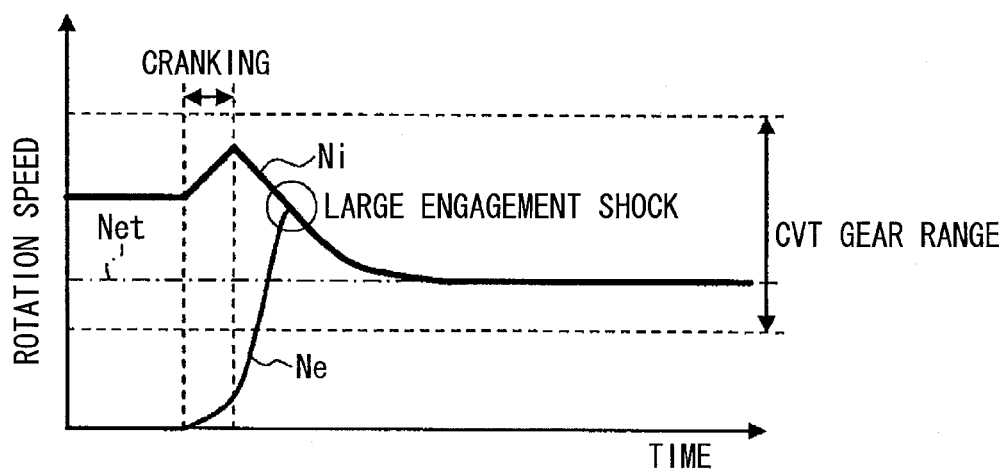

As shown, the engine rotation speed Ne is increased by increasing a rotation speed of the start rotor by operation of the CVT 22. In this case, since the transmission side rotation speed Ni also increases, a margin may be provided between the target rotation speed Net and transmission side rotation speed Ni. As a result, combustion control of the engine 12 may be started easily during a period where a rotation speed of the start rotor is increased. FIGS. 9A, 9B, and 9C show an example in which the combustion control is started while a rotation speed of the start rotor increases. FIG. 9A shows an example in which the transmission side rotation speed Ni is decreased by increasing the total speed ratio after start of the combustion control.

Additionally, in this embodiment, the engine rotation speed Ne and transmission side rotation speed Ni are both controlled to the target rotational speed Net to transition the one-way bearing 28 to the engaged state smoothly. On the other hand, FIG. 9C shows a case where the one-way bearing 28 is engaged by once controlling the engine rotation speed Ne to the transmission side rotation speed Ni. In this case, sudden transition to the engaged state of the one-way bearing 28 tends to be made, and vibration tends to be produced at the engagement.

Figure 10:
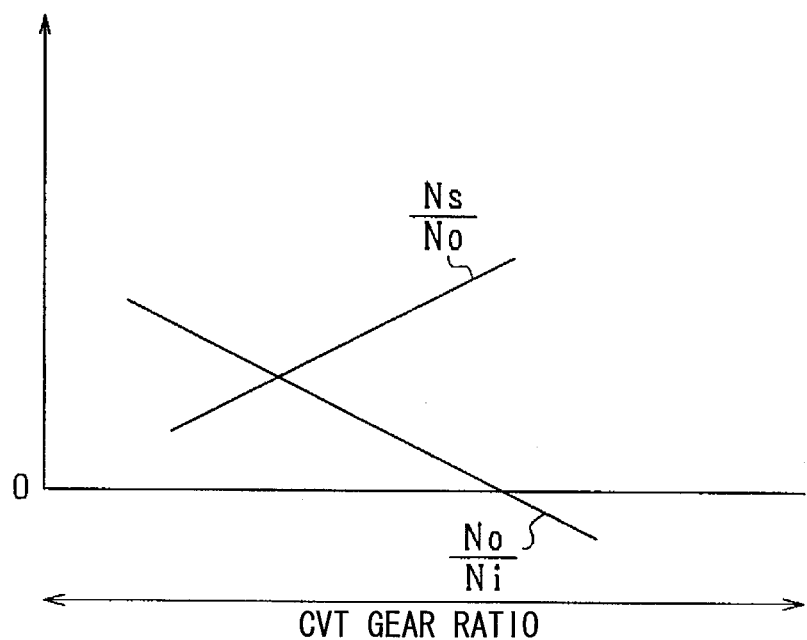
FIG. 10 shows a setting of engine start in Mode 1 of the first embodiment.
Figure 11A:
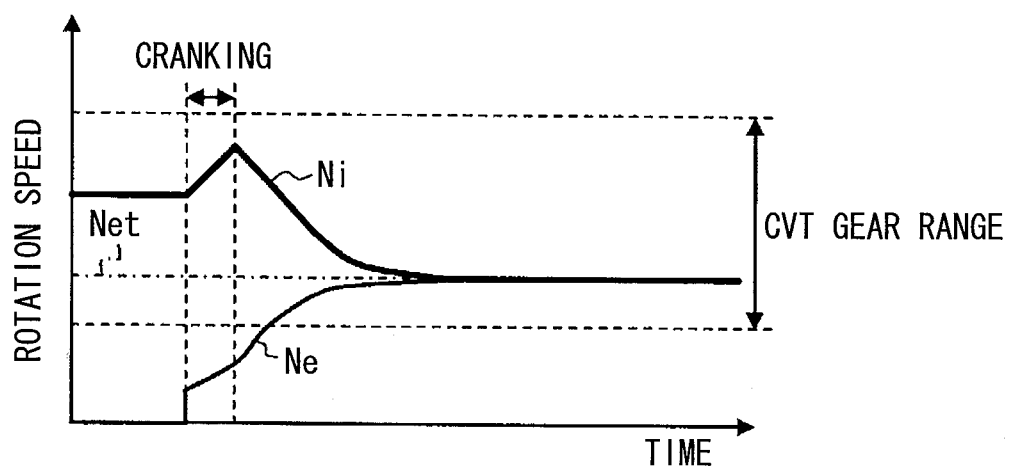
FIGS. 11A and 11B show time charts showing engine start in Mode 1 of the first embodiment.
Figure 11B:
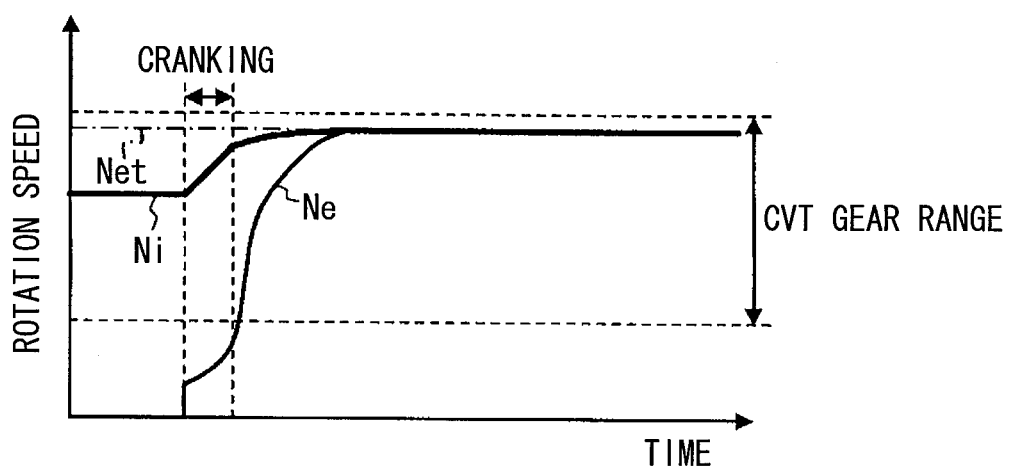

In this embodiment, the same setting as above is made also in Mode 1 for start of the engine 12. FIG. 10 shows the setting in Mode 1 of this embodiment. As shown, Mode 1 also is set to increase the transmission side rotation speed Ni relative to the output side rotation speed No so that the start rotation speed Ns also increases. FIGS. 11A and 11B show the engine start in Mode 1. In the example of FIGS. 11A, 11B, since a rotation speed of the ring gear R, which is the start rotor, may not be zero in Mode 1 unless rotation speeds of the motor generator 10 and drive wheels 14 are zero, a rotation speed of the engine 12 increases at cranking in a stepping manner. This shows that the engine 12 follows the ring gear R after the engagement of the clutch C3 to rapidly increase the engine rotation speed Ne to a rotation speed of the ring gear R.

According to this embodiment explained above in detail, the following advantageous effects are achieved.

(1) To engage the one-way bearing 28 after start of combustion control of the engine 12, the engine rotation speed Ne is controlled to the target rotational speed Net, and a rotation speed of the transmission rotor (sun gear S) is controlled to the target rotational speed Net by operating the CVT 22. As a result, the one-way bearing 28 may be engaged smoothly, and the vibration due to the engagement may be preferably avoided.

(2) The low start set is provided such that when a ratio (No/Ni) of a rotation speed (output side rotation speed No) of the drive wheels 14 relative to the transmission side rotation speed Ni is lowered by increasing the transmission side rotation speed Ni, the start rotation speed Ns is increased. As a result, even when the engine rotation speed Ne increases rapidly as the combustion of the engine 12 starts, a peak value of a rotation speed of the input side of the one-way bearing 28 due to this rapid increase may be preferably prevented from exceeding a rotation speed of the output side of the one-way bearing 28.

(3) The combustion control of the engine 12 is started during a period where the transmission side rotation speed Ni is increased relative to the output side rotation speed No. As a result, a speed difference between the engine rotation speed Ne and the transmission side rotation speed Ni is securable just before the start of combustion of the engine 12.

(4) Provided that a speed difference of the transmission side rotation speed Ni, which is on the output side of the one-way bearing 28, relative to the engine rotation speed Ne, which is on the input side of the one-way bearing 28, becomes a predetermined speed or more, a combustion control of the engine 12 is started. As a result, a rotation speed of the input side of the one-way bearing 28 may be certainly prevented from being equal to or over a rotation speed of the output side of the one-way bearing 28 at the start of combustion control of the engine 12.

(5) In Mode 2, under the situation where rotation speeds of the motor generator 10 and drive wheels 14 are not zero, a rotation speed of the ring gear R, which is the start rotor, is set to be permitted to be zero, and when a start request for the engine 12 arises, a rotation speed of the ring gear R is increased gradually from a rotation speed of the output shaft of the engine 12 by operating a gear ratio of the CVT 22. Thus, the supply of power of the start rotor to the engine 12 may be smoothly started by permitting a geared neutral state of the ring gear R. In this case, by increasing a rotation speed of the engine 12, a change amount of the gear ratio of the CVT 22 tends to be large. Even in this case, a rotation speed of the transmission rotor (sun gear S) increases. Accordingly, a speed difference between the engine rotation speed Ne and the transmission side rotation speed Ni may be secured easily.

[Second Embodiment]

Hereinafter, a second embodiment is explained concentrating on the differences from the first embodiment in reference to the drawings.

Figure 12:
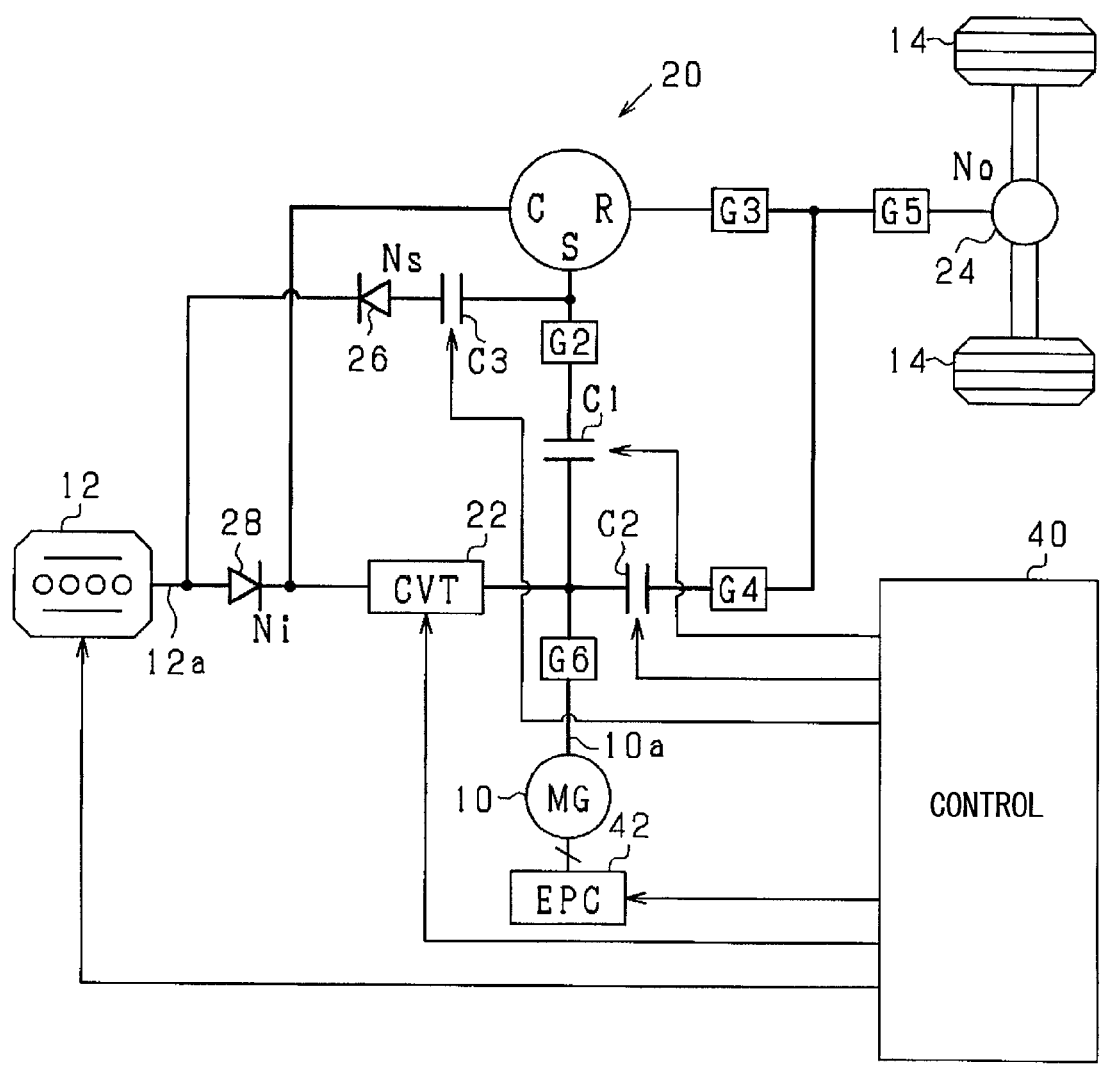
FIG. 12 shows a system structure of a second embodiment.

FIG. 12 shows a system structure of this embodiment. In FIG. 12, the components corresponding to ones shown in FIG. 1 are indicated by similar reference numerals for convenience.

As shown, in this embodiment, a start rotor is the sun gear S, and a transmission rotor is the carrier C. The gears G3 and G5 are used to mechanically couple the ring gear R to the drive wheels 14. Here, in this embodiment, the gears G2 to G5 are both counter gears, and the gear G6 is a forward gear.

Figure 13:
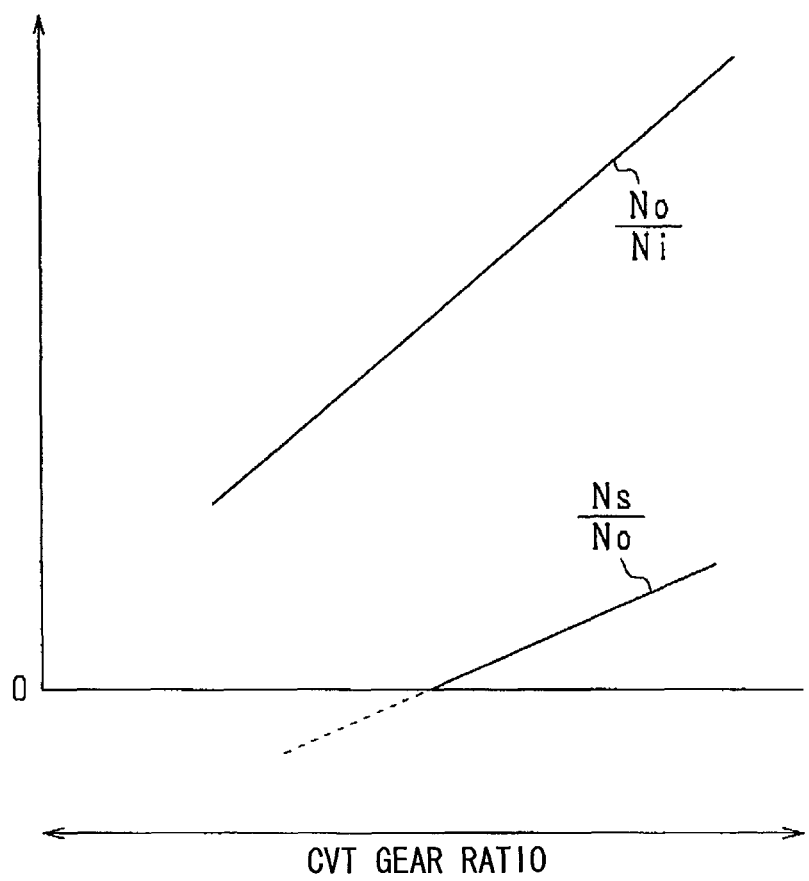
FIG. 13 shows a setting of engine start in Mode 2 of the second embodiment.

With such a structure, in Mode 2, as shown in FIG. 13, the transmission side rotation speed Ni is set to be decreased relative to the output side rotation speed No to increase the start rotation speed Ns. In other words, the start rotation speed Ns is set to be increased by heightening the total speed ratio, which is a value obtained by dividing the output side rotation speed No by the transmission side rotation speed Ni.

Figure 14A:
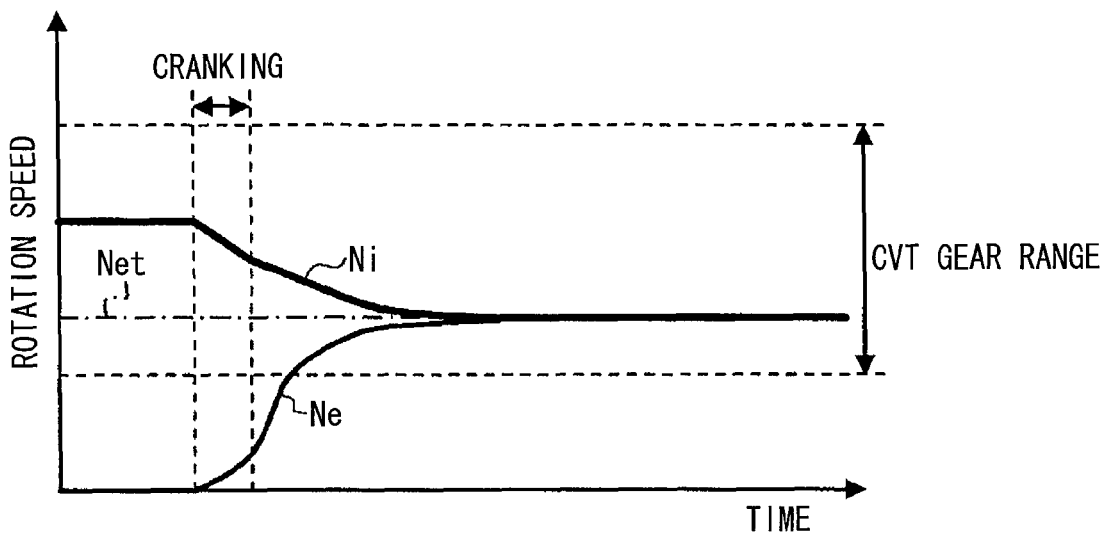
FIGS. 14A and 14B show time charts showing engine start in Mode 2 of the second embodiment.
Figure 14B:
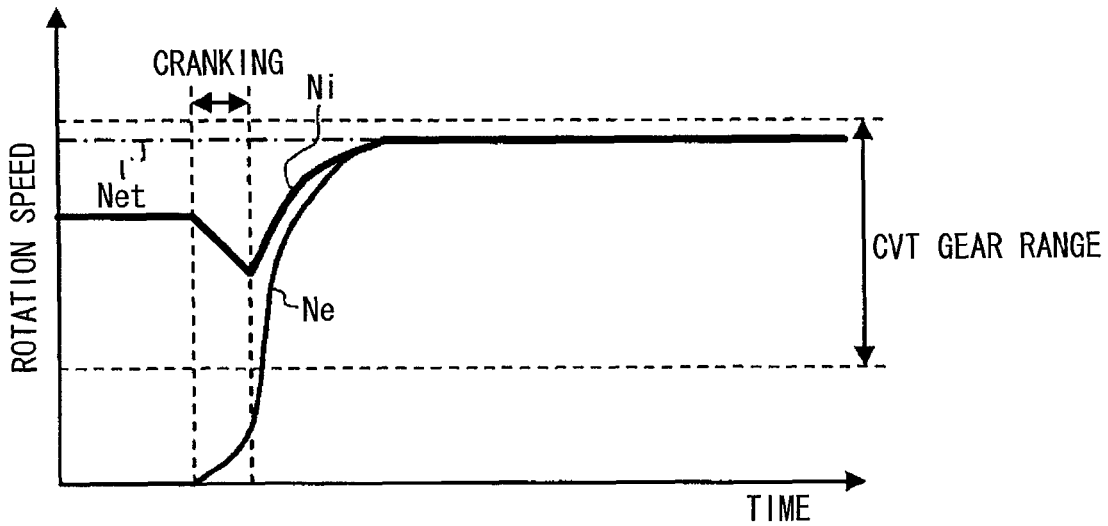

FIGS. 14A and 14B show an engine start of this embodiment. According to this embodiment, as shown in FIG. 14A, even when the transmission side rotation speed Ni before the engine start is sufficiently higher than the engine rotation speed Ne and the target rotational speed Net of the engine 12, transition to the engaged state of the one-way bearing 28 may be made quickly. FIG. 14 shows an example in which the combustion control is started while a rotation speed of the start rotor increases. FIG. 14B shows an example in which the one-way bearing 28 is engaged by once heightening and then lowering the total speed ratio in response to the start of the engine 12. Unless the transmission side rotation speed Ni before the start of the engine 12 is excessively high relative to the target rotational speed Net, a time taken to engage the one-way bearing 28 does not become too long.

In this embodiment, a system in which the engine 12 is not started in Mode 1 is assumed.

According to this embodiment described above, in addition to the advantageous effects of the above (1) and (4) of the first embodiment, the following advantageous effects may be further obtained.

(6) A high start set is provided such that when a ratio of a rotation speed (output side rotation speed No) of the drive wheels 14 relative to the transmission side rotation speed Ni is heightened by decreasing the transmission side rotation speed Ni. As a result, a time taken to engage the one-way bearing 28 may be shortened after the start of the engine 12.

(7) The combustion control of the engine 12 is started during a period where the transmission side rotation speed Ni is decreased relative to the output side rotation speed No. As a result, after the start of the engine 12, a time taken to engage the one-way bearing 28 may be further shortened.

[Third Embodiment]

Hereafter, a third embodiment is described in reference to the drawings, concentrating on the differences from the first embodiment.

Figure 15:
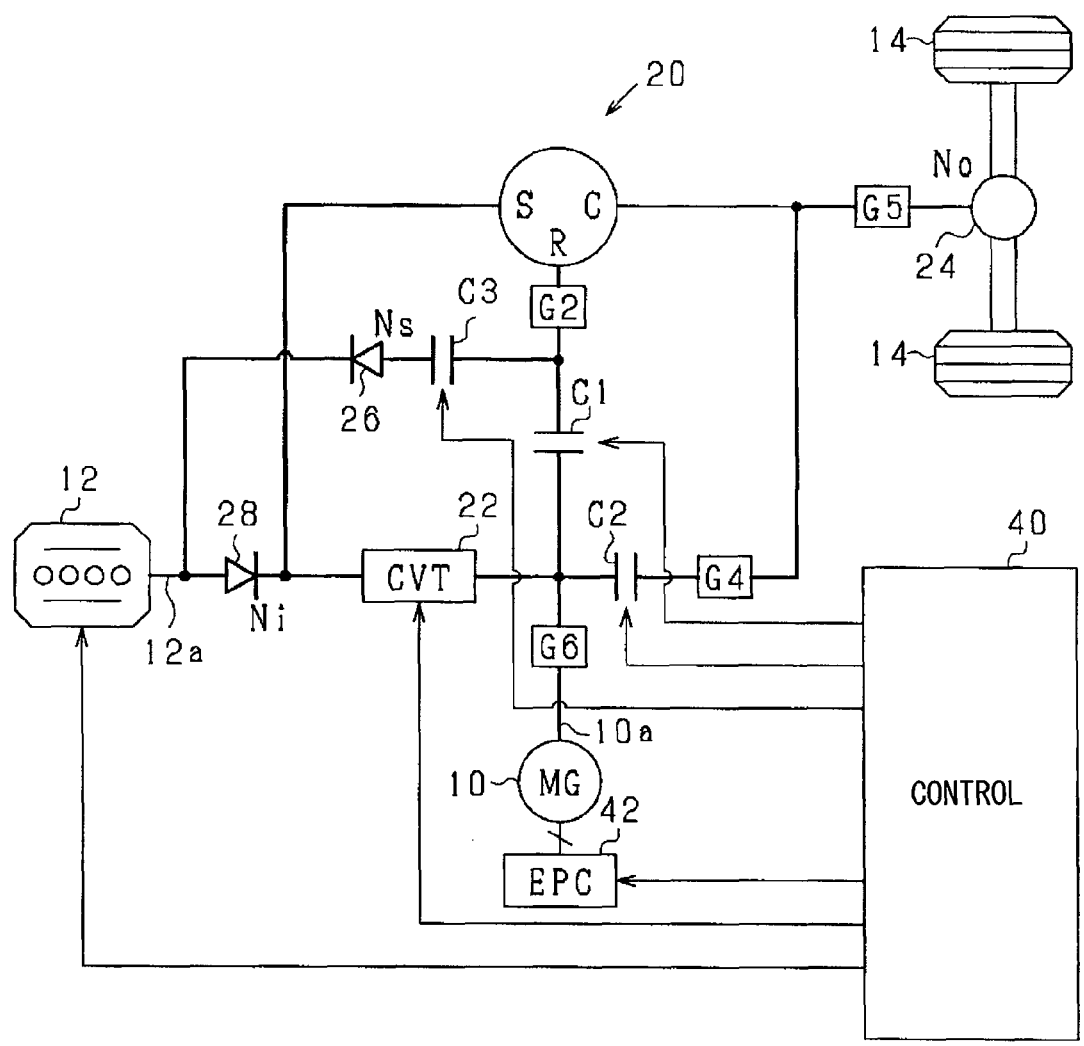
FIG. 15 shows a system structure of a third embodiment.

FIG. 15 shows a system structure of this embodiment. In FIG. 15, components corresponding to ones shown in FIG. 12 are indicted by the similar reference numerals for convenience.

Figure 16:
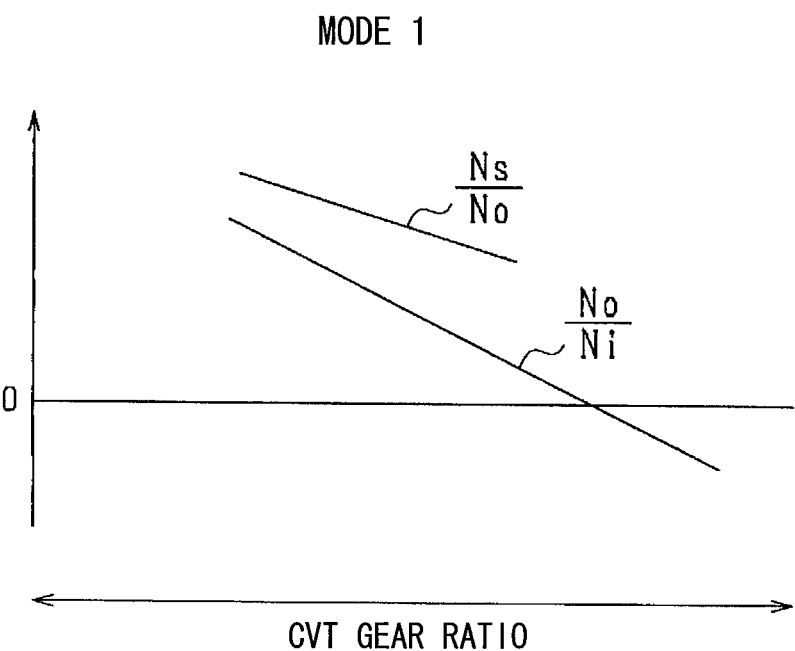
FIG. 16 shows a setting of engine start in Mode 1 of the third embodiment.

In this embodiment, the counter gear (gear G2) is provided between the ring gear R and the clutch C3. In such a structure, the low start is set in Mode 2 ; the high start is set in Mode 1 as shown in FIG. 16.

Figure 17A:
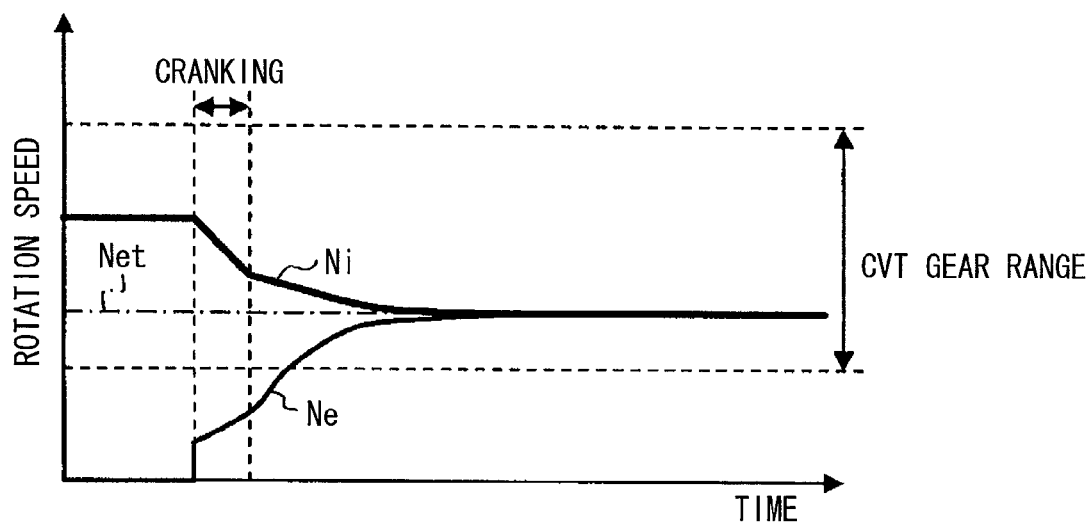
FIGS. 17A and 17B show time charts showing the engine start in Mode 1 of the third embodiment.
Figure 17B:
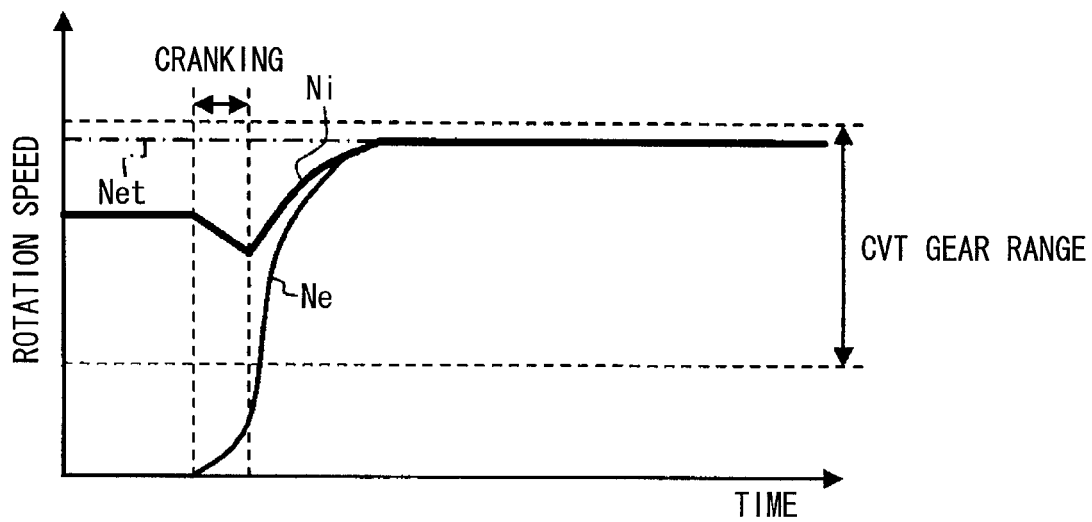

FIGS. 17A and 17B show an engine start in Mode 1 of this embodiment.

[Another Embodiment]

The above-mentioned embodiments may be modified and implemented as follows.

<Transmission Start Control Section>

A structure without this section also is possible. That is, for example, even when the control is made to designate the output side rotation speed of the one-way bearing 28 as the target rotation speed, advantageous effect by the low start set and low start set may be obtained when the low start and high start are set. The transmission start control section may also be referred to as a transmission start control device or means.

<Target Speed Setting Section>

In the above embodiments, a calculation of the target rotational speed Net is triggered by the completion of the start of the engine 12. The trigger is not limited to the completion of the start, but may be a start request of the engine 12, for example. The target speed setting section may also be referred to as a target speed setting device or means.

<Low Start Control Section>

In the first embodiment, the combustion control of the engine 12 is started during a period in which the total speed change ratio is being lowered. In addition, the combustion control of the engine 12 may be started before the total speed change ratio is heightened after being lowered. The low start control section may be also referred to as a low start control device or means.

The low start control section is not limited to one in which the combustion control is started on the condition that a relative speed of the output rotation speed (transmission side rotation speed Ni) of the one-way bearing 28 to the input side rotation speed (the engine rotation speed Ne) of the one-way bearing 28 becomes a predetermined speed or more (not limited to one including a speed difference securing section, device, or means). Even when the condition is not satisfied, power transmission shock via the one-way bearing 28 may be eased by starting the combustion control, for example, in lowering the total speed ratio.

<Transmission Power Transmission Regulating Section>

A one-way transmission mechanism that transmits power to apply torque of the engine 12 to the drive wheels 14 on the condition that a relative rotation speed of the input side (the side coupled with the engine 12, or the engine side) to a rotation speed of the output side (the transmission rotor side of the power split mechanism 20) is not negative is not limited to the one-way bearing 28, but may be a one-way clutch. The mechanism is not limited to one in which the output side follows the input side without slippage, but may be one in which power is applied while slippage. The transmission power transmission regulating section may be also referred to as a transmission power transmission regulating device or means.

Further, a one-way transmission mechanism and an electronically-controlled clutch may be used together.

The transmission power transmission regulating section is not limited to one including the one-way transmission mechanism. For example, the transmission power transmission regulating section may include only the electronically-controlled clutch instead of the one-way transmission mechanism. Even in this case, to match rotation speeds of rotors on both sides of the clutch, the transmission power transmission regulating section effectively include a section, device, or means (transmission start control section, device, or means) to control the rotation speeds to the target rotational speed Net of the engine 12. To relieve the condition relating to a rotation speed of the transmission rotor at the combustion start of the engine 12, it is effective to provide the low start set and the low start control section, device, or means. Further, to engage the clutch quickly after the combustion start of the engine 12, it is effective to provide the high start set and a high start control section, device, or means.

<Start Power Transmission Regulating Section>

A start power transmission regulating section that switches transmission and interruption of torque between the engine 12 and the start rotor of the power split mechanism 20 to start the engine 12 is not limited to one including the clutch C3 and one-way bearing 26. For example, the start power transmission regulating section may include only the clutch C3. In this case, for example, when the clutch C3 is disengaged before the combustion start of the engine 12 after an initial rotation is applied to the output shaft 12a of the engine 12, the torque suddenly increasing at the combustion start in the engine 12 may be preferably prevented from being transmitted to the power split mechanism 20. For example, the start power transmission regulating section, device, or means may include only the one-way bearing 26. The start power transmission regulating section may be also referred to as a start power transmission regulating device or means.

The clutch C3 may be provided on the input side of the one-way bearing 26.

Further, the one-way transmission mechanism that transmits power on a condition that a relative rotation speed of the start rotor side (input side) of the power split mechanism 20 to the output shaft 12a (output side) of the engine 12 is not negative is not limited to the one-way bearing 26, but may be, for example, a one-way clutch. The one-way transmission mechanism is not limited to one in which the output side follows the input side without slippage, but may be one in which power is supplied while slippage.

An interruption section, device, or means that interrupts power transmission via the path via which power is transmitted from the power split mechanism 20 to the output shaft 12a of the engine 12 to start the engine 12 is not limited to the normally-open clutch C3, but may be a normally-closed clutch.

<Speed Ratio Varying Section>

A mechanical continuously variable transmission is not limited to a belt type one, but may be a traction drive type one. The continuously variable transmission is not limited to a mechanical one, but may be a hydraulic one. Further, instead of the continuously variable transmission, a geared transmission may be used. The speed ratio varying section may be also referred to as a speed ratio varying device or means.

<Use of Power Circulation (Mode 1)>

Each above embodiment uses power circulation to switch a rotation speed of the drive wheels 14 among positive, zero, and negative while fixing a sign of a rotation speed of a driving source (for example, the motor generator 10), but may not use the power circulation. For example, a rotation speed of the drive wheels 14 when a sign of a rotation speed of the driving source remains constant may be limited to a range in one direction from zero. In this case, a sign of a rotation speed of drive wheels 14 may be reversed by reversing the motor generator 10. Instead, a sign of a rotation speed of the drive wheels 14 may be reversed by changing a mechanical coupling mode of the power split rotors and the driving source and drive wheels 14 without reversing a sign of a rotation speed of the motor generator 10.

Thus, the inventors have found that, when a sign of a rotation speed of the drive wheels 14 is not reversed by operating a gear ratio of the CVT 22, a change amount of the total speed ratio relative to the operation of the gear ratio of the CVT 22 in Mode 1 may be made small to reduce a withstanding capability of the CVT 22.

<Power Split Mechanism>

The power split mechanism is not limited to one shown in each above embodiment. For example, in each above embodiment, the sun gear S, carrier C, and ring gear R may be replaced. Also in this case, a setting of a planetary gear mechanism and gears among the motor generator 10, engine 12, and drive wheels 14 achieves the same advantageous effect as in each above embodiment.

The power split mechanism is not limited to one including only one planetary gear mechanism, but may be one including two planetary gear mechanisms as described, for example, in Patent document 1.

<Power Split Rotors>

In the above embodiments, the planetary gear mechanism formed of the power split rotors uses one having a so-called double pinion in which a rotation speed of the carrier C may be zero when signs of rotation speeds of the sun gear S and ring gear R are the same, but is not limited to one having the double pinion. For example, the planetary gear mechanism may use a so-called single pinion one in which a rotation speed of the carrier C may be zero when signs of a rotation speeds of the sun gear S and ring gear R are different from one another.

Instead of the power split rotors forming the planetary gear mechanism, ones forming a differential gear may be used.

[Alternatives]

Figure 18:
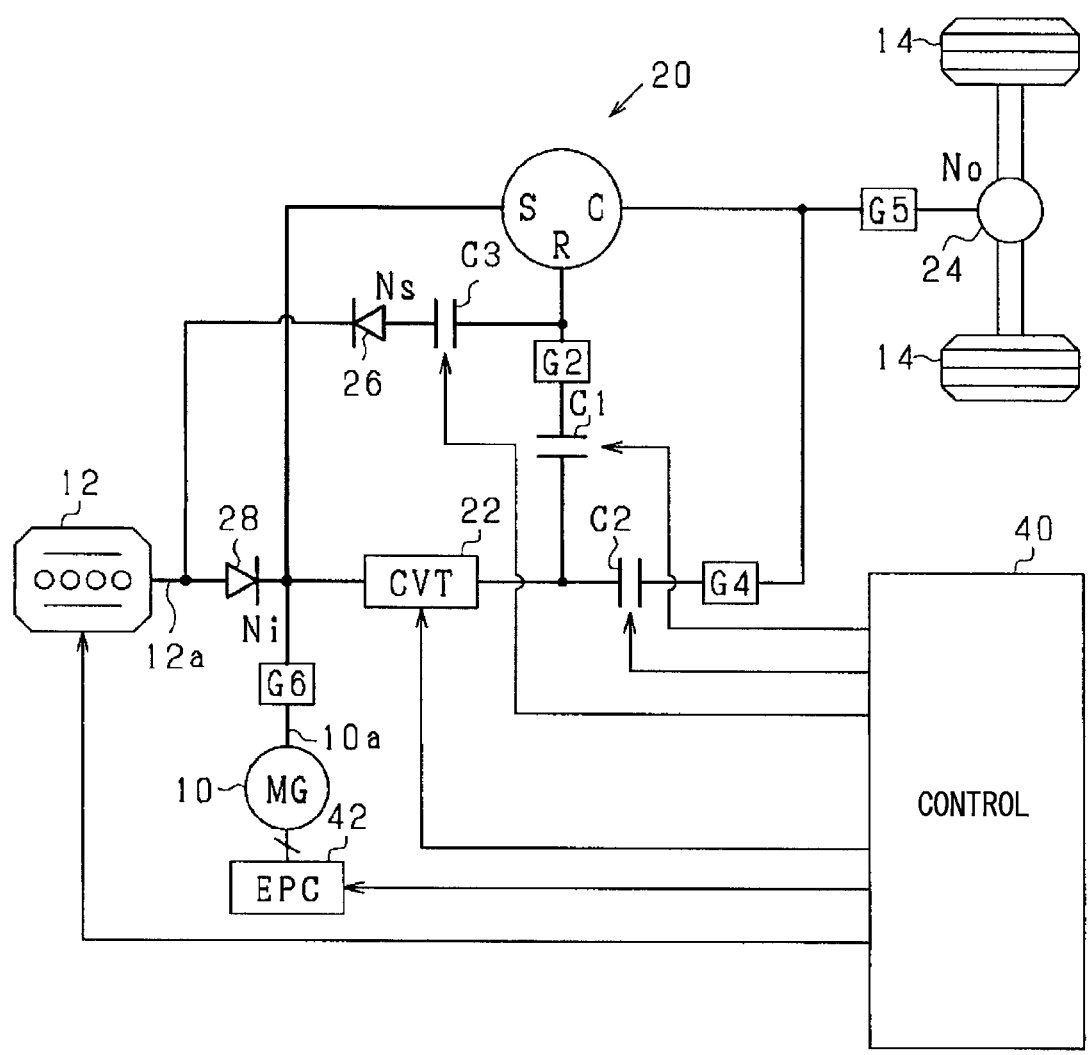
FIG. 18 shows a system structure of a modification of each above embodiment.

In each above embodiment, in Mode 2, the motor generator 10 may transmit power to the drive wheels 14 without transmitting power via the CVT 22, but another power transmission is possible. For example, as shown in FIG. 18, the rotation shaft 10a of the motor generator 10 may be mechanically coupled between the one-way bearing 28 and the CVT 22 to couple power of the motor generator 10 to the drive wheels 14 via the CVT 22 in Mode 2. In FIG. 18, the components similar to those shown in FIG. 1 are indicated by the similar reference numerals for convenience.

A structure of an alternative is not limited to one in which Mode 1 and Mode 2 are switchable.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed:

1. A power transmission unit having a plurality of power split rotors that rotate in conjunction with each other to split power among a rotary electric apparatus, an internal combustion engine, and drive wheels,
the power split rotors including:
a start rotor that supplies a start rotational force to the internal combustion engine; and
a transmission rotor that is separate from the start rotor and mechanically coupled to the internal combustion engine,
the power transmission unit comprising:
a speed ratio varying device that makes variable a speed ratio, which is a ratio of a rotation speed of the drive wheels relative to a rotation speed of the transmission rotor;
a start power transmission regulating device that switches transmission and interruption of power from the start rotor to the internal combustion engine;
a transmission power transmission regulating device that switches transmission and interruption of power from the internal combustion engine to the transmission rotor; and
a controller configured to:
set a target rotation speed of the internal combustion engine on a basis of requested power for the internal combustion engine when a start request of the internal combustion engine arises;
control a rotation speed of the internal combustion engine to the target rotation speed so as to output power of the internal combustion engine to the transmission power transmission regulating device after start of combustion control of the internal combustion engine, and
control, by operating the speed ratio varying device, an output side of the transmission power transmission regulating device to a rotation speed of an input side of the transmission power transmission regulating device at a time when the rotation speed of the internal combustion engine becomes the target rotation speed, the output side of the transmission power transmission regulating device being coupled with the transmission rotor.

2. The power transmission unit according to claim 1, wherein the controller comprises:
a low start setting such that when a ratio of a rotation speed of the drive wheels relative to a rotation speed of the transmission rotor is lowered by increasing the rotation speed of the transmission rotor using the speed ratio varying device, a rotation speed of the start rotor increases.

3. The power transmission unit according to claim 2, wherein the controller is configured to:
start combustion control of the internal combustion engine (i) during a period where the rotation speed of the transmission rotor is increased relative to the rotation speed of the drive wheels using the speed ratio varying device or (ii) before a decrease process where the rotation speed of the transmission rotor is decreased relative to the rotation speed of the drive wheels using the speed ratio varying device after the period.

4. The power transmission unit according to claim 3, wherein the controller is configured to:
ensure a speed difference by starting the combustion control of the internal combustion engine provided that a relative rotation speed of the transmission rotor relative to the internal combustion engine is equal to or greater than a predetermined speed, the transmission rotor being on an output side of the transmission power transmission regulating device, the internal combustion engine being on an input side of the transmission power transmission regulating device.

5. The power transmission unit according to claim 1, wherein the controller comprises:
a high start setting such that when a ratio of a rotation speed of the drive wheels relative to a rotation speed of the transmission rotor is heightened by decreasing the rotation speed of the transmission rotor using the speed ratio varying device, a rotation speed of the start rotor increases.

6. The power transmission unit according to claim 5, wherein the controller is configured to:
start combustion control of the internal combustion engine during a period where the rotation speed of the transmission rotor is decreased relative to the rotation speed of the drive wheels using the speed ratio varying device.

7. The power transmission unit according to claim 1, wherein:
the transmission power transmission regulating device includes a one-way transmission mechanism that outputs power of an input side of the one-way transmission mechanism to an output side of the one-way transmission mechanism on a condition that a relative rotation speed of the input side to the output side is not negative, the input side being a side coupled with the internal combustion engine, the output side of the one-way transmission mechanism being a side coupled with the transmission rotor.

8. The power transmission unit according to claim 1, wherein:
the rotation speed of the start rotor is enabled to be set to be zero on a condition that rotation speeds of the rotary electric apparatus and a driving shaft are other than zero,
the power transmission unit further comprising:
a gradual increase device that gradually increases the rotation speed of the start rotor from a rotation speed of an output shaft of the internal combustion engine by operating the speed ratio varying device, when a start request of the internal engine arises.

9. The power transmission unit according to claim 1, wherein:
- the power split rotors include a sun gear, a carrier, and a ring gear, the sun gear, the carrier, and the ring gear forming a planetary gear mechanism; and
- the speed ratio varying device is a continuously variable transmission mechanically coupled to the planetary gear mechanism.

10. A power transmission unit having a plurality of power split rotors that rotate in conjunction with each other to split power among a rotary electric apparatus, an internal combustion engine, and drive wheels,
the power split rotors including:
- a start rotor that supplies a start rotational force to the internal combustion engine; and
- a transmission rotor separate from the start rotor and mechanically coupled to the internal combustion engine, the power transmission unit comprising:
- a speed ratio varying device that varies a speed ratio, which is a ratio of a rotation speed of the drive wheels relative to a rotation speed of the transmission rotor;
- a start power transmission regulating device that switches transmission and interception of power from the start rotor to the internal combustion engine; and
- a transmission power transmission regulating device that switches transmission and interception of power from the internal combustion engine to the transmission rotor,
wherein a low start setting is provided such that when a ratio of a rotation speed of the drive wheels relative to a rotation speed of the transmission rotor is lowered by increasing the rotation speed of the transmission rotor using the speed ratio varying device, a rotation speed of the start rotor increases.

11. The power transmission unit according to claim 10, further comprising:
- a controller configured to start combustion control of the internal combustion engine (i) during a period where the rotation speed of the transmission rotor is increased relative to the rotation speed of the drive wheels using the speed ratio varying device or (ii) before the rotation speed of the transmission rotor is decreased relative to the rotation speed of the drive wheels after the period using the speed ratio varying device.

12. The power transmission unit according to claim 11, wherein:
- the controller is configured to ensure a speed difference by starting the combustion control of the internal combustion engine provided that a relative rotation speed of the transmission rotor relative to the internal combustion engine is equal to or greater than a predetermined speed, the transmission rotor being on an output side of the transmission power transmission regulating device, the internal combustion engine being on an input side of the transmission power transmission regulating device.

13. The power transmission unit according to claim 10, wherein:
- the transmission power transmission regulating device includes a one-way transmission mechanism that outputs power of an input side of the one-way transmission mechanism to an output side of the one-way transmission mechanism on a condition that a relative rotation speed of the input side to the output side is not negative, the input side being a side coupled with the internal combustion engine, the output side of the one-way transmission mechanism being a side coupled with the transmission rotor.

14. The power transmission unit according to claim 10, wherein:
- the rotation speed of the start rotor is enabled to be set to be zero on a condition that rotation speeds of the rotary electric apparatus and a driving shaft are other than zero,
the power transmission unit further comprising:
- a gradual increase device that gradually increases the rotation speed of the start rotor from a rotation speed of an output shaft of the internal combustion engine by operating the speed ratio varying device, when a start request of the internal engine arises.

15. The power transmission unit according to claim 10, wherein:
- the power split rotors include a sun gear, a carrier, and a ring gear, the sun gear, the carrier, and the ring gear forming a planetary gear mechanism; and
- the speed ratio varying device is a continuously variable transmission mechanically coupled to the planetary gear mechanism.

* * * * *